Feb. 3, 1931.  W. PEARSALL  1,791,373
AUTOMATIC SETTING MACHINE
Filed Dec. 23, 1927   16 Sheets-Sheet 1

WITNESSES

INVENTOR
William Pearsall
BY
ATTORNEY

Feb. 3, 1931.  W. PEARSALL  1,791,373
AUTOMATIC SETTING MACHINE
Filed Dec. 23, 1927   16 Sheets-Sheet 2

WITNESSES

INVENTOR
William Pearsall
BY
ATTORNEY

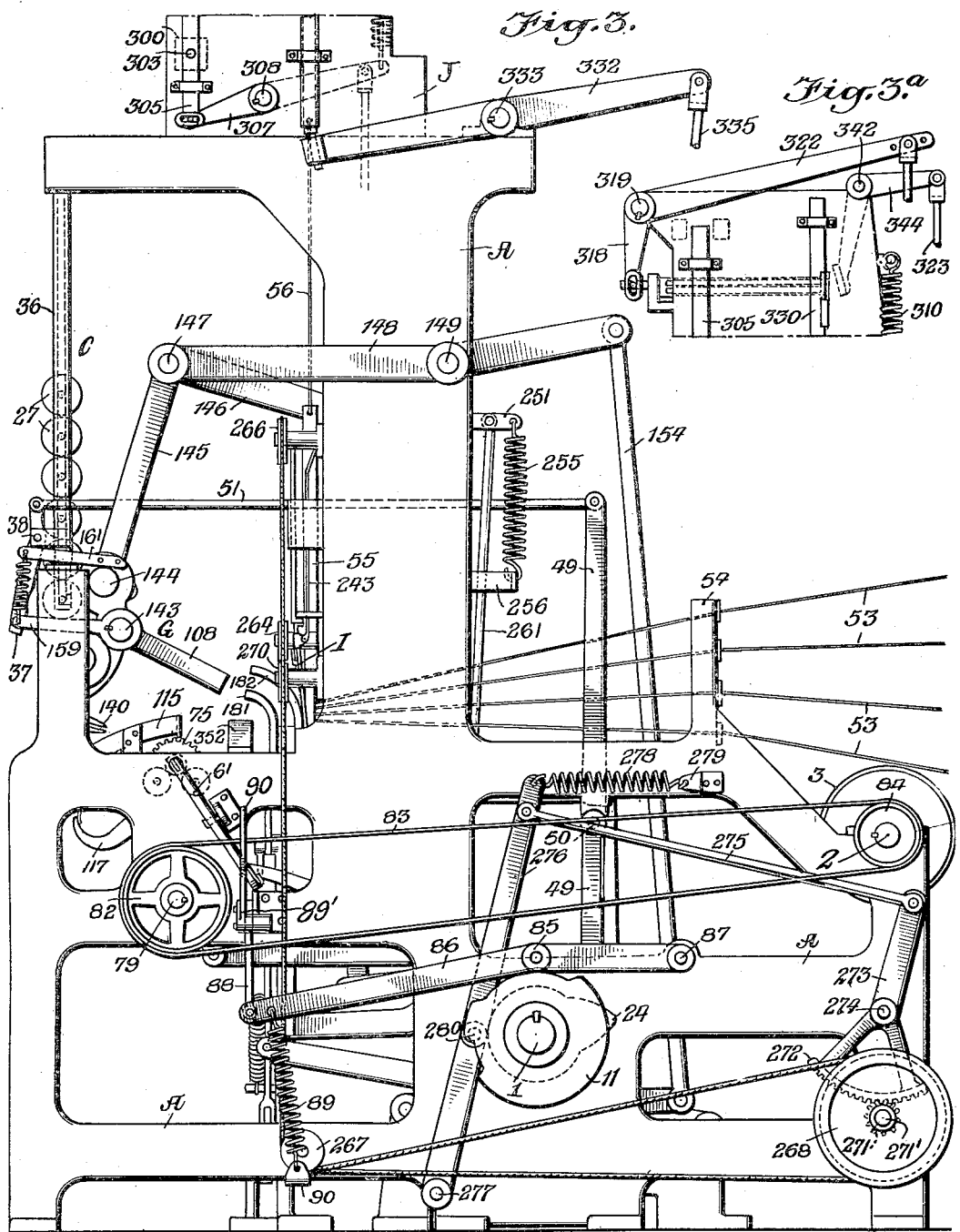

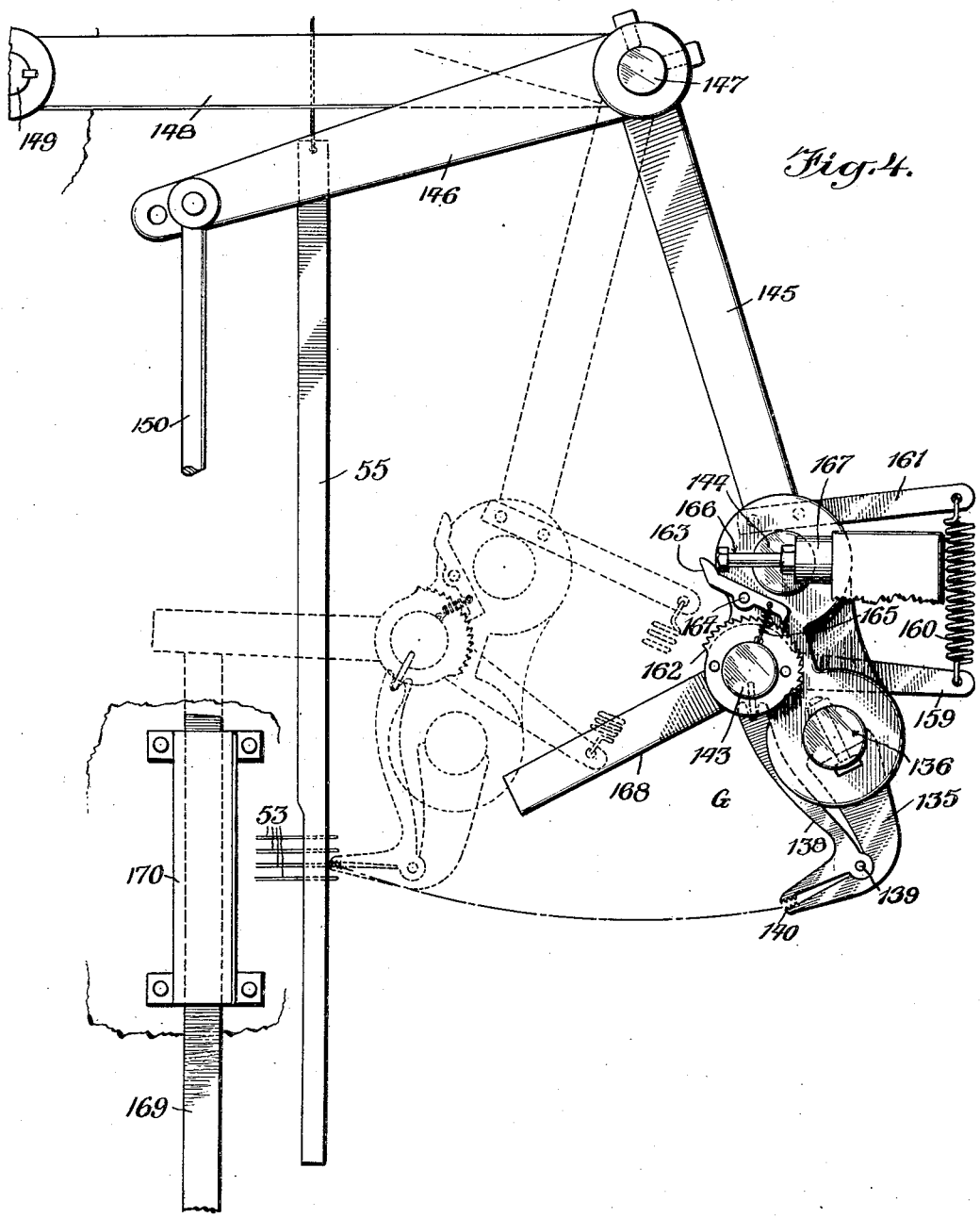

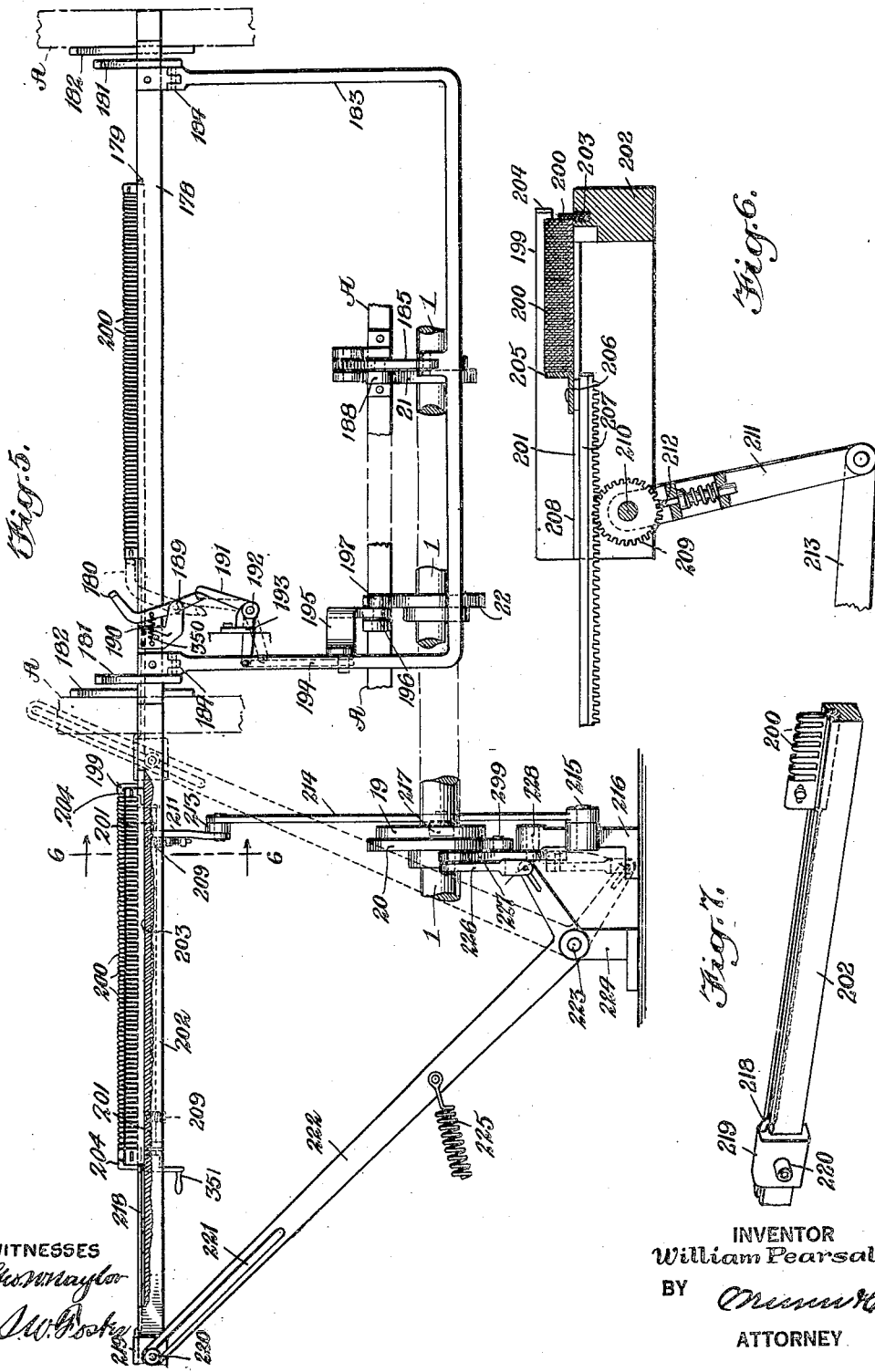

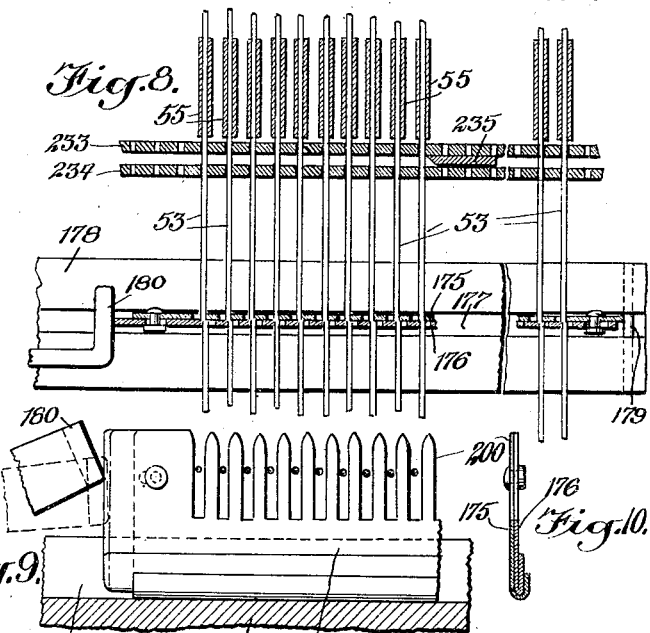
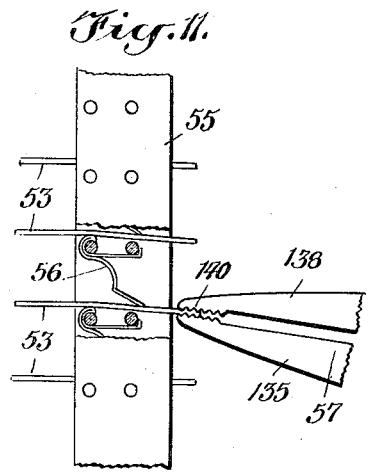
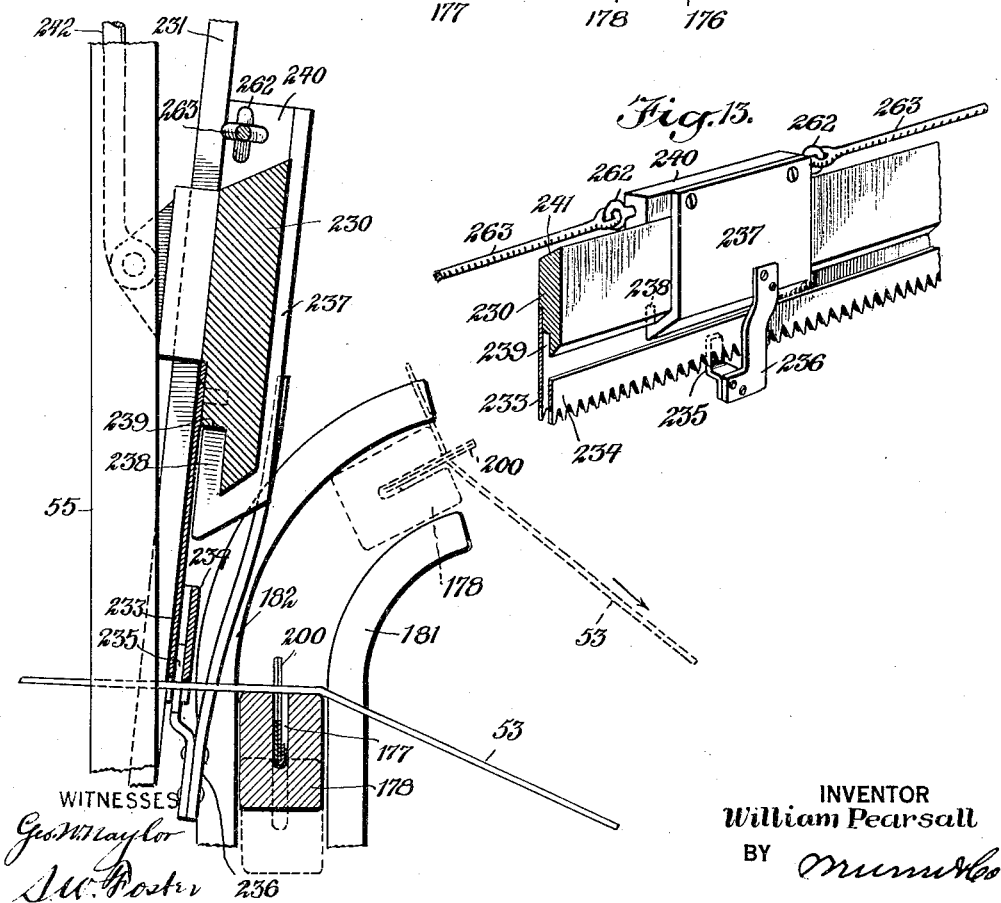

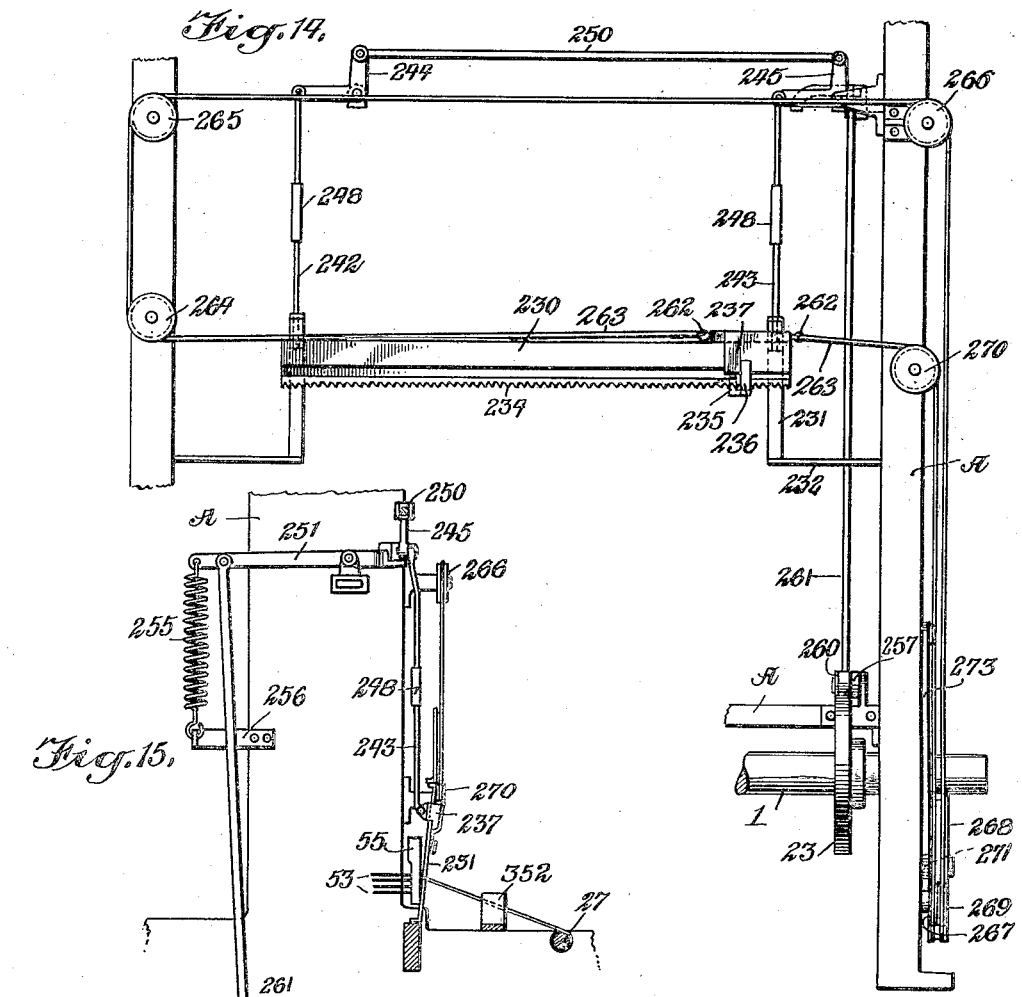

Feb. 3, 1931.   W. PEARSALL   1,791,373
AUTOMATIC SETTING MACHINE
Filed Dec. 23, 1927   16 Sheets-Sheet 8
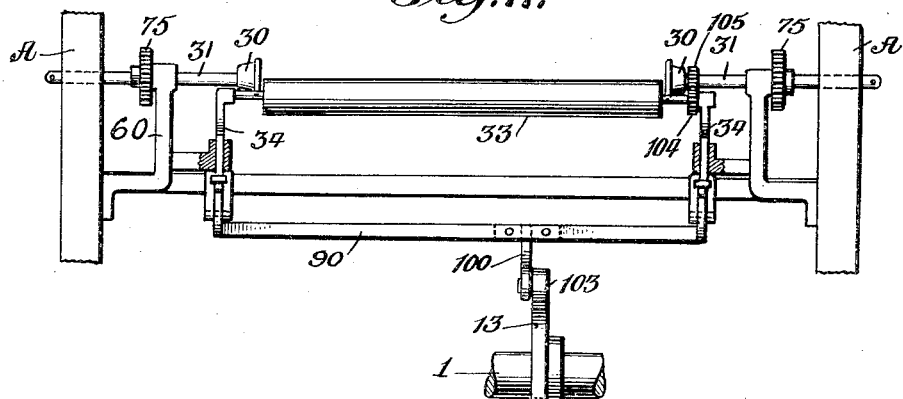
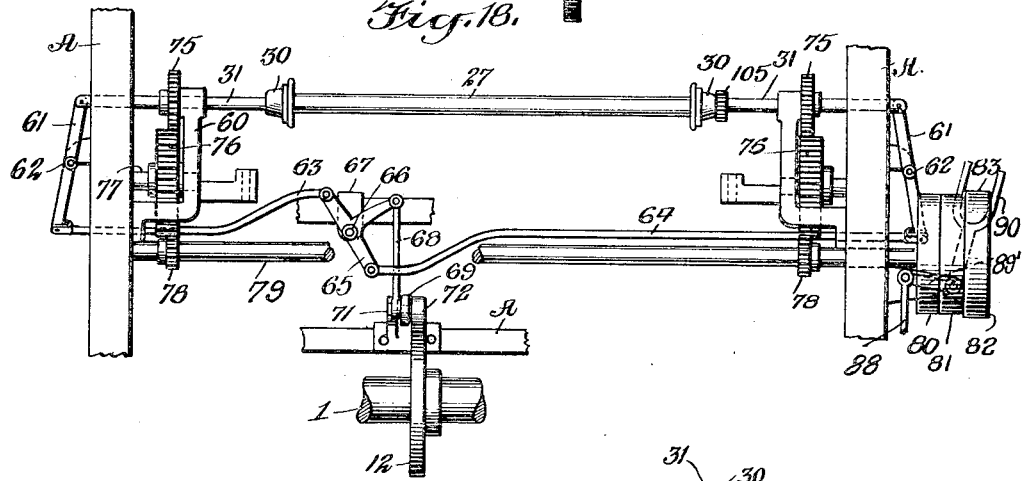
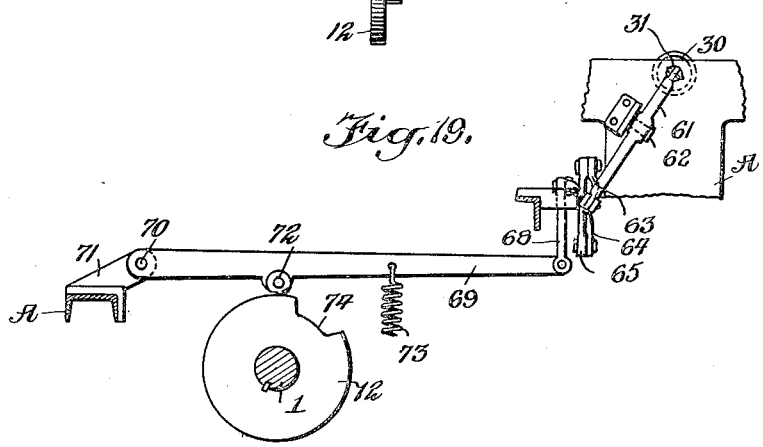
WITNESSES
INVENTOR
William Pearsall
BY
ATTORNEY

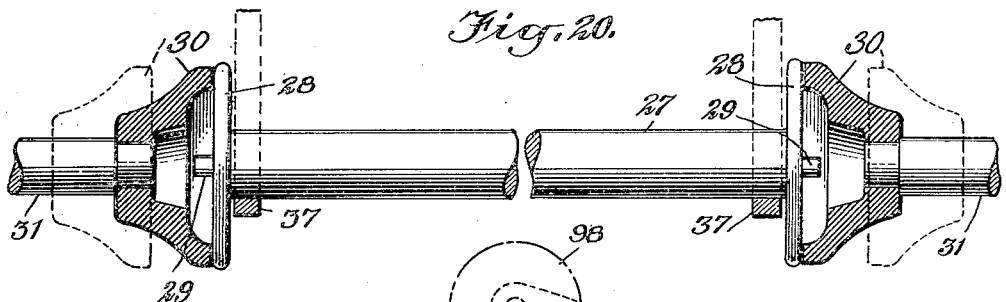
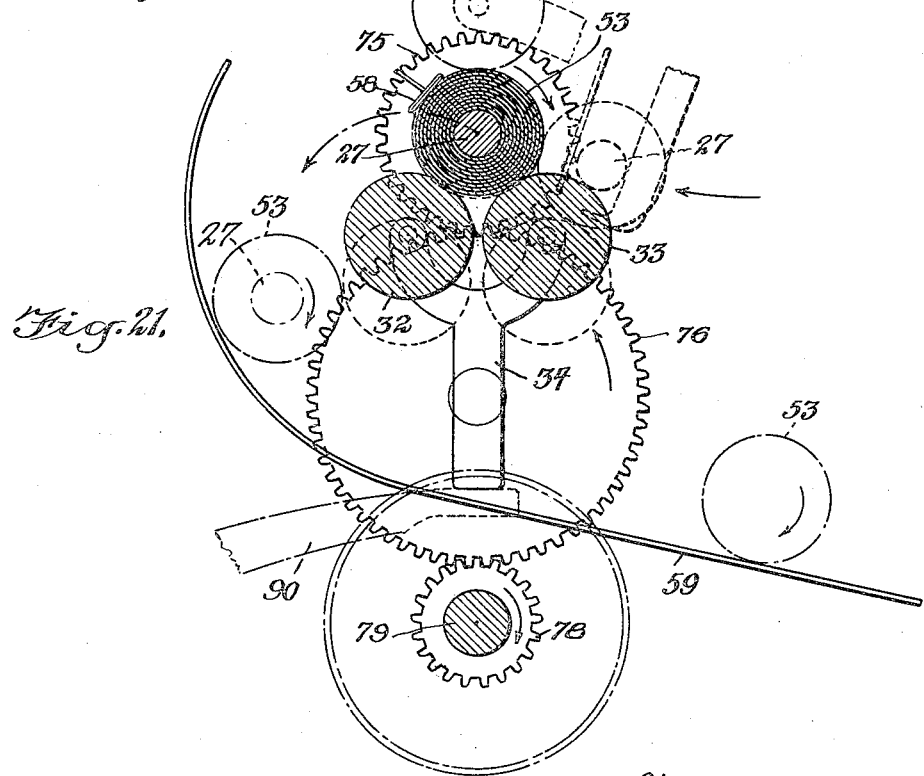
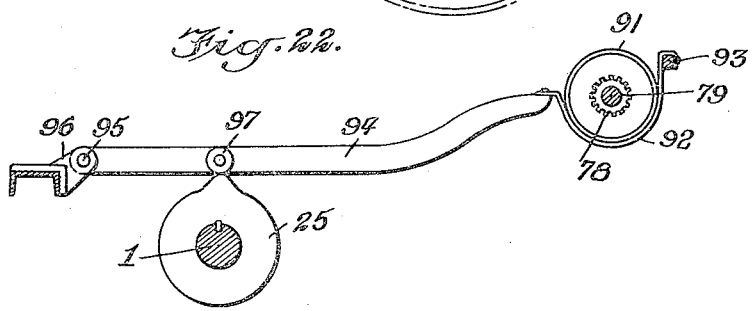

Feb. 3, 1931. W. PEARSALL 1,791,373
AUTOMATIC SETTING MACHINE
Filed Dec. 23, 1927 16 Sheets-Sheet 10
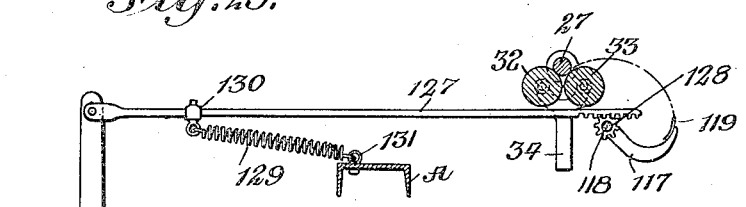
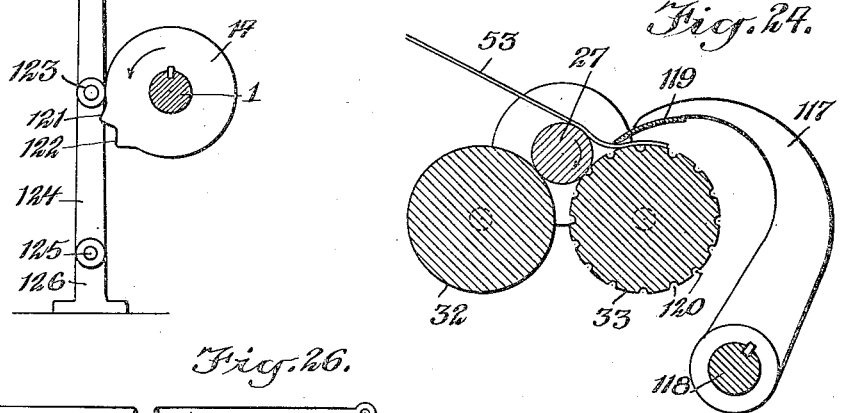
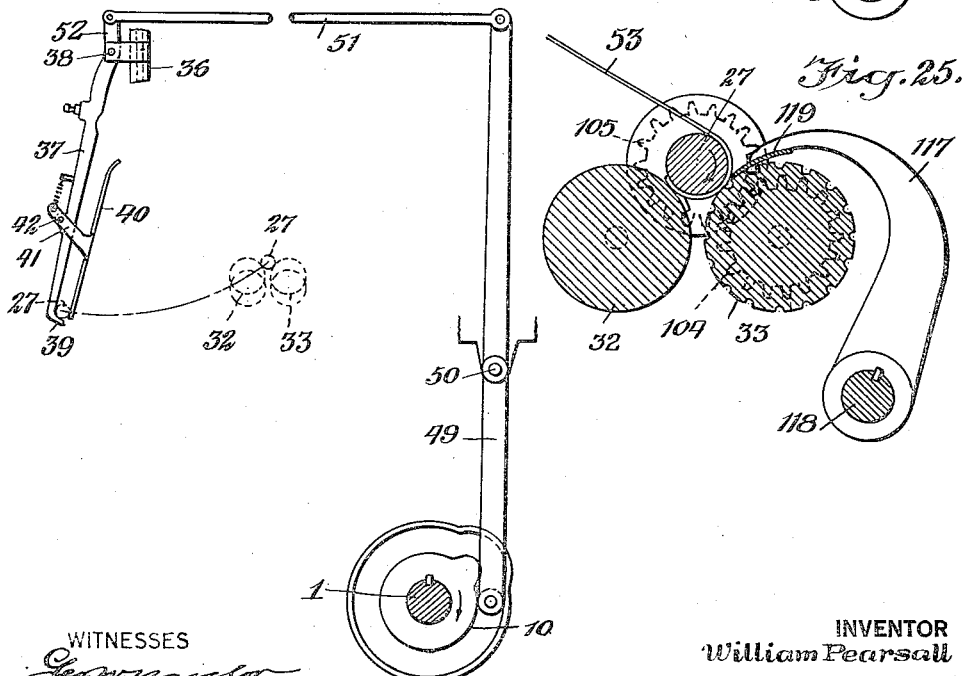
INVENTOR
William Pearsall
BY
ATTORNEY

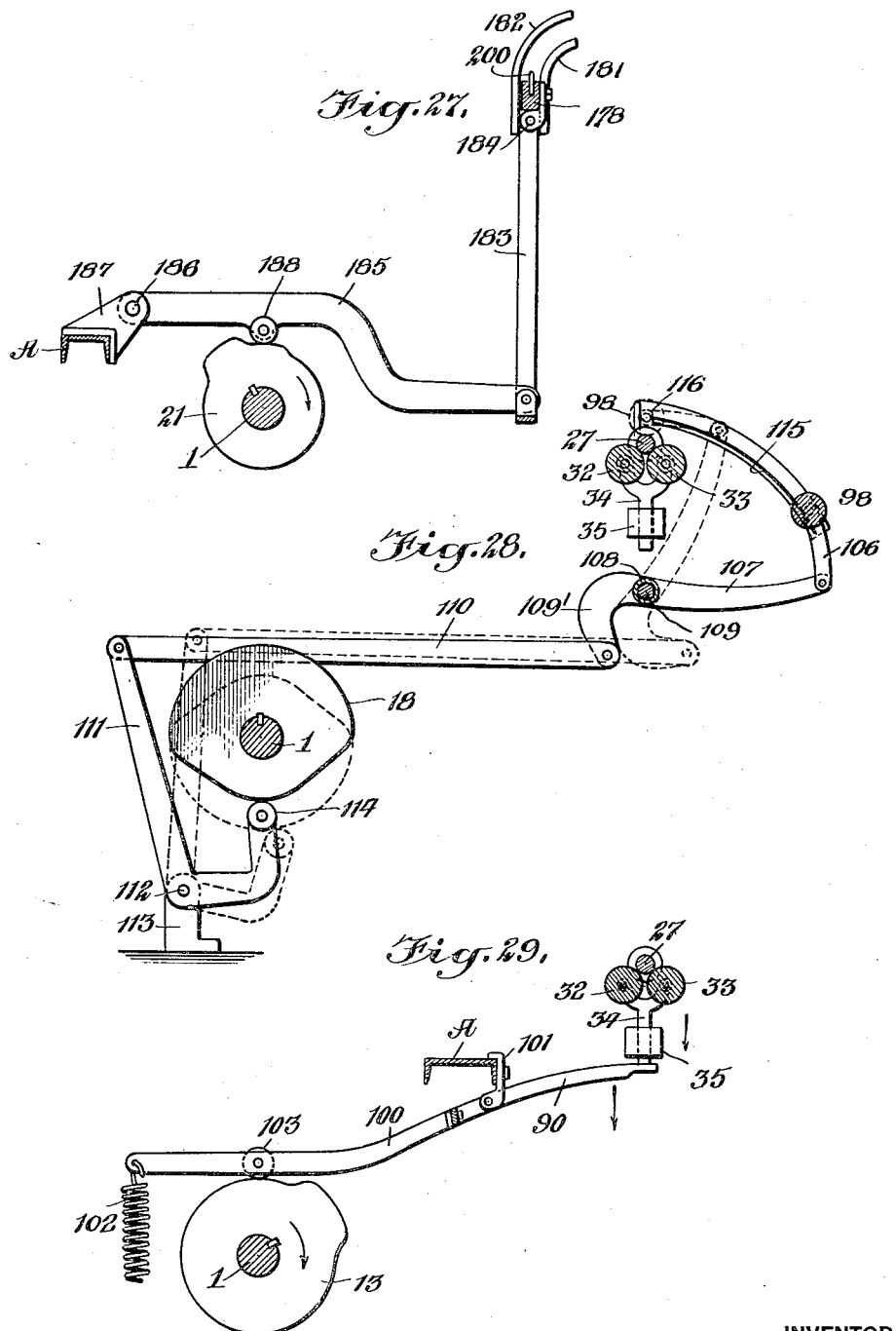

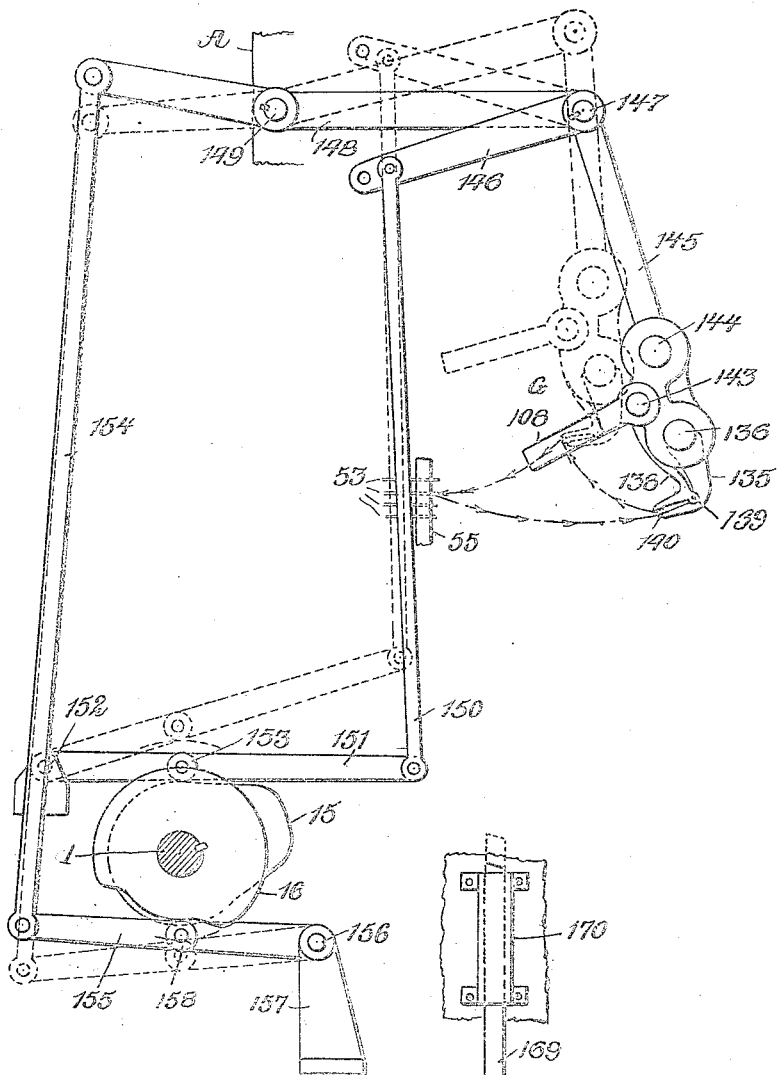

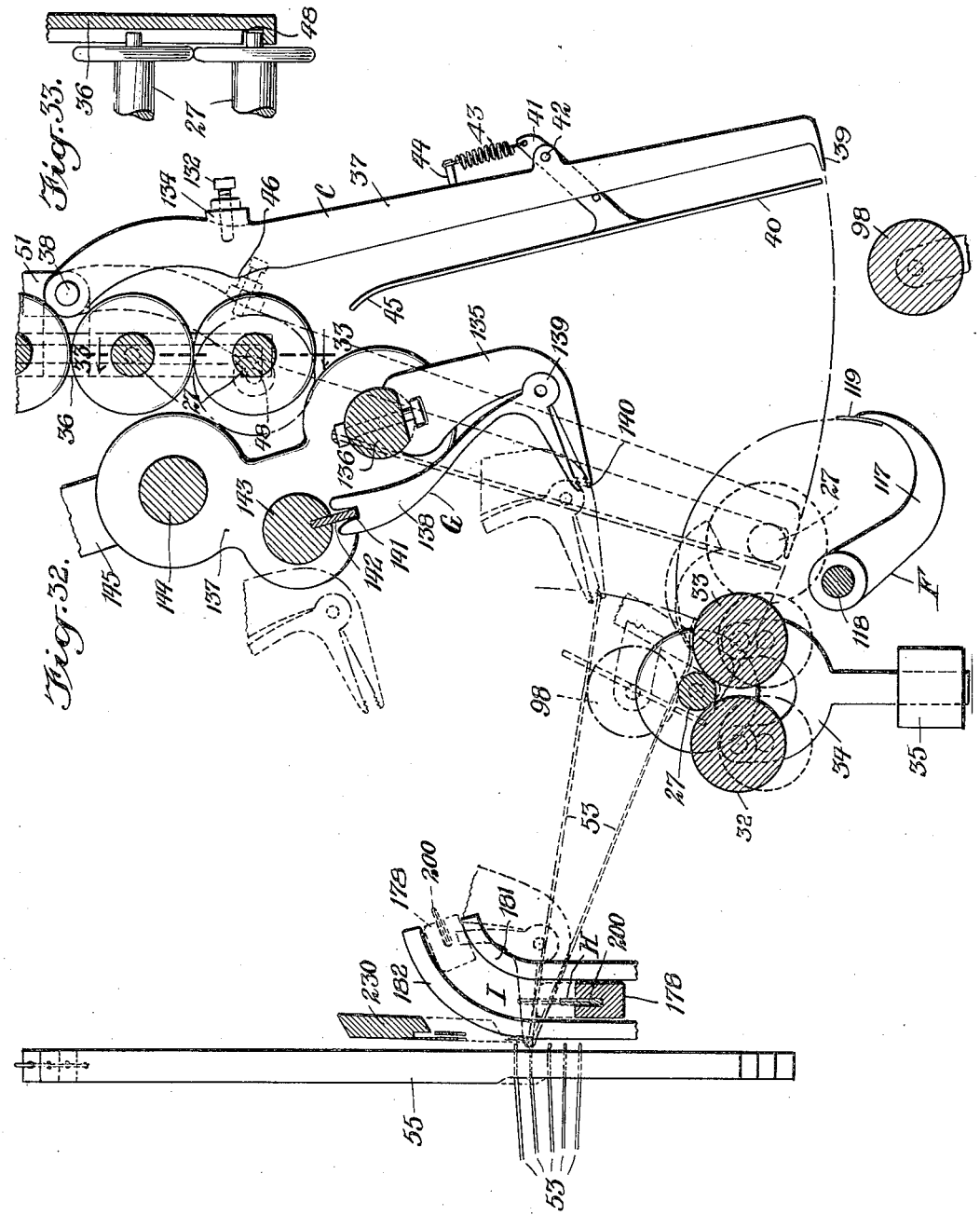

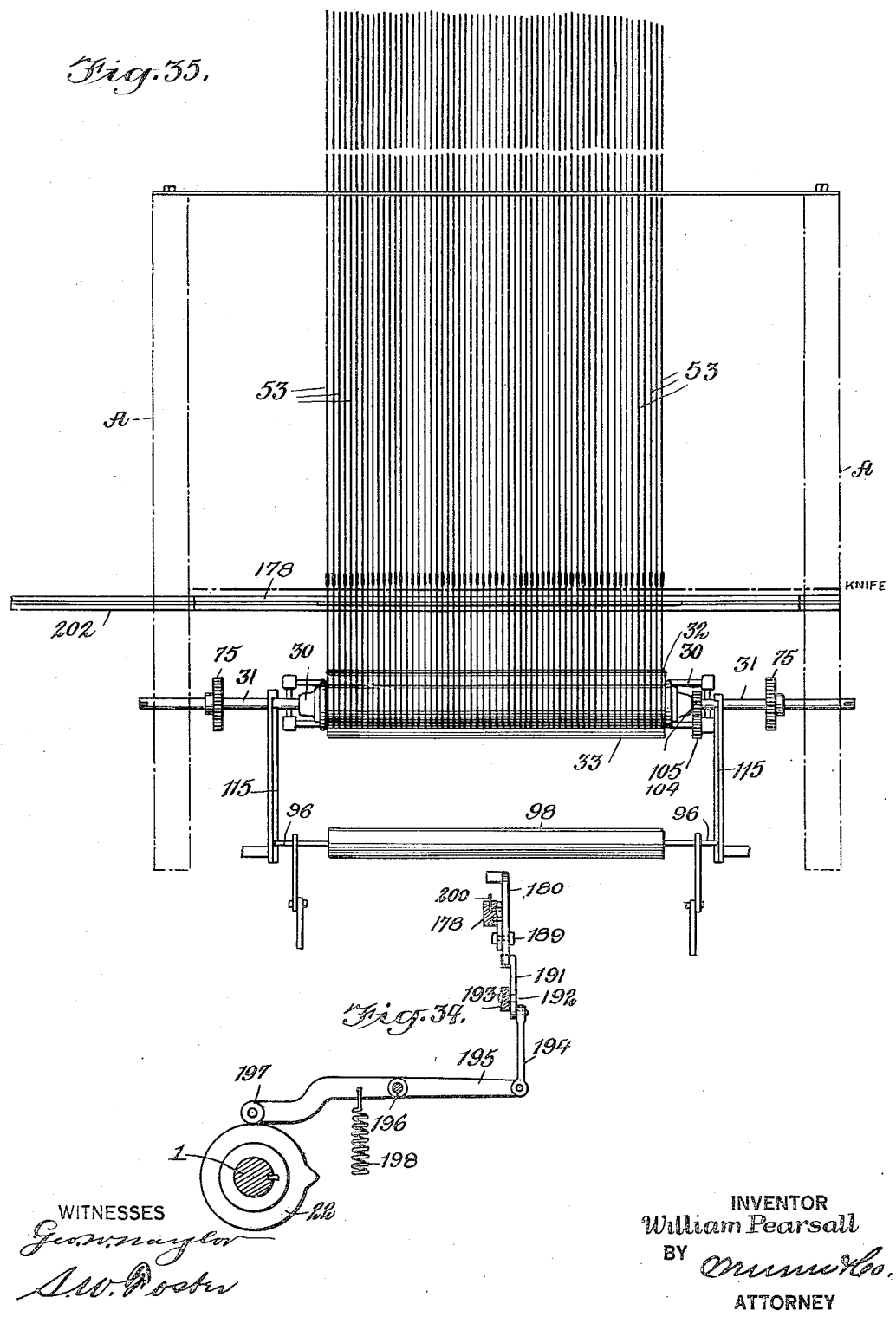

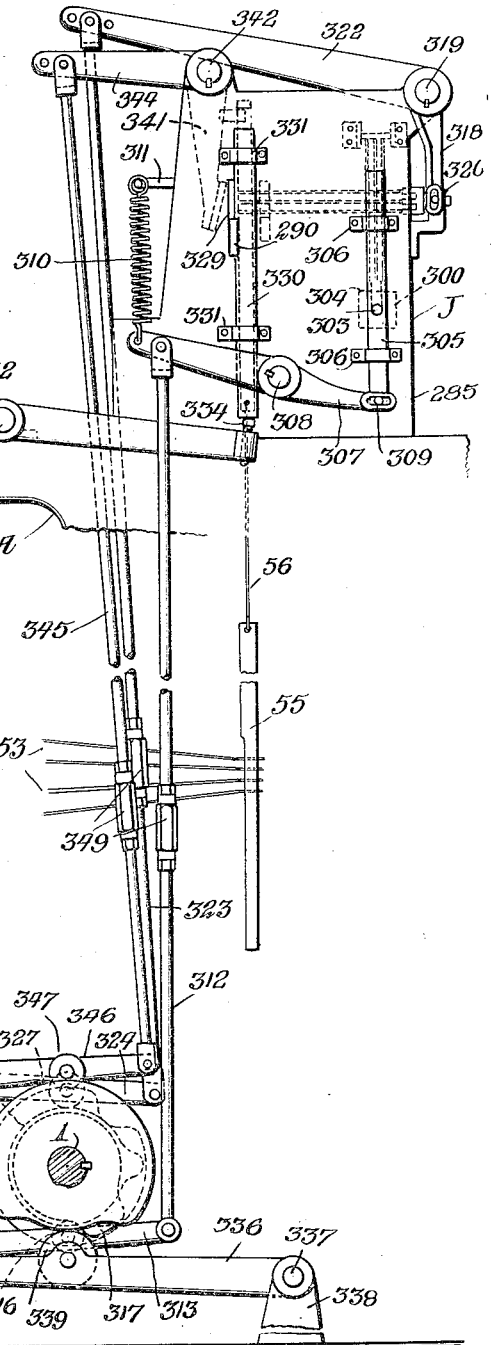

INVENTOR
William Pearsall
BY
ATTORNEY

Patented Feb. 3, 1931

1,791,373

UNITED STATES PATENT OFFICE

WILLIAM PEARSALL, OF THOMPSONVILLE, CONNECTICUT, ASSIGNOR TO BIGELOW-SANFORD CARPET CO., INC., OF THOMPSONVILLE, CONNECTICUT, A CORPORATION OF MASSACHUSETTS

AUTOMATIC SETTING MACHINE

Application filed December 23, 1927. Serial No. 242,182.

This invention relates to an automatic setting machine, an object of the invention being to provide a machine which will automatically wind on spools the desired length of yarn properly disposed on the spool so as to provide yarns of different colors for use on a loom to form the design of a carpet, rug or the like.

The invention includes jacquard means for positioning yarns of different colors, means for engaging the yarn so positioned and drawing the same over a spool, means for compelling the yarn to wind on the spool automatically; causing a clamp to engage the yarn and hold the strands thereof apart; means for cutting the yarn after a desired length has been wound on the spool; means for placing a new spool in operative position and ejecting the wound spool; and mechanism causing all of said means to operate in the proper unison or synchronism so that the operation is entirely automatic.

Heretofore the work of setting, as it is known in the textile industry, has been done by hand, girls receiving high wages being employed to manually select yarns of different colors in accordance with a design, and control the operation of a mechanism for winding a spool with the different colors of yarn, and it is the broad purpose of my invention to provide a machine which will automatically perform this work and result in a saving of time and labor and greater perfection in performance.

With these and other objects in view, the invention consists in certain novel features of construction and combinations and arrangements of parts, which will be more fully hereinafter described and pointed out in the claims.

In the accompanying drawings—

Figure 3 is a view in side elevation taken from the right side of Figure 1;

Figure 3a is a view in elevation of the jacquard mechanism which is removed from the upper portion of Figure 3;

Figure 4 is a detail view illustrating one of my improved grippers and a portion of its operating mechanism;

Figure 5 is a view illustrating in detail the mechanism for controlling the positioning and operation of my improved clamps, the view being taken transversely through the machine and parts being omitted for clearness;

Figure 6 is a view in section on the line 6—6 of Figure 5;

Figure 7 is a perspective view of a portion of the track along which the clamps are moved;

Figure 8 is a fragmentary sectional plan view showing the clamp, cutter, and yarn in operative position;

Figure 9 is a view in longitudinal section through the clamp holder, showing one end of the clamp in side elevation;

Figure 10 is a view in vertical transverse section through one of the clamps;

Figure 11 is a fragmentary detail view, partly in side elevation and partly broken away, illustrating one of my improved yarn carriers with a gripper engaging a strand of yarn thereon;

Figure 12 is a view in vertical transverse section on an enlarged scale and in detail illustrating my improved cutting mechanism, clamp, and adjacent parts;

Figure 13 is a fragmentary sectional perspective view of the cutting mechanism;

Figure 14 is a detail view, in elevation, taken transversely through the machine, illustrating my improved cutting mechanism and the operating means therefor;

Figure 15 is a view at right angles to Figure 14 looking at the right of said figure;

Figure 16 is a fragmentary perspective view on an enlarged scale illustrating details of the cutter operating mechanism;

Figure 17 is a detail view, partly in elevation and partly in section, the view being transversely of the machine, illustrating the spool winding mechanism and the lower presser rolls;

Figure 18 is a view similar to Figure 17 but omitting the presser rolls and illustrating the controlling mechanism for a spool which is shown in operative position on the winding mechanism;

Figure 38:
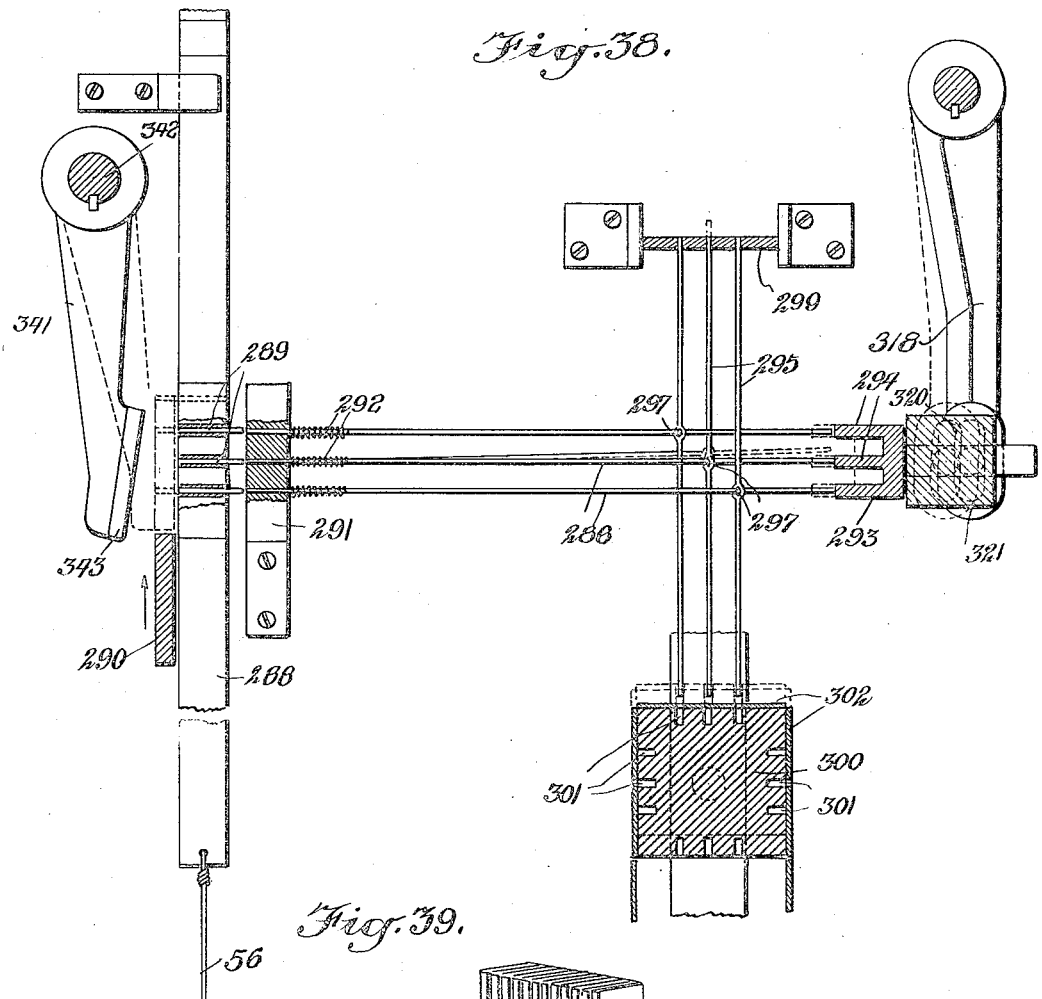
Figure 39:
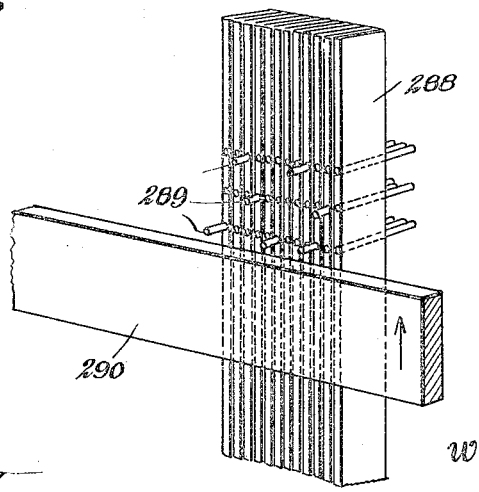

Figure 19 is a view, partly in section and mainly in elevation, taken from the right side of Figure 18;

Figure 20 is a detail view, partly in elevation and partly in section, showing the gripping devices which engage the end of a spool for supporting and imparting rotary motion thereto;

Figure 21 is a view in section showing in detail the arrangement of presser rolls, spool and adjacent parts;

Figure 22 is a detail view in elevation showing my improved brake mechanism for stopping the machine during the operation of the cutter;

Figure 23 is a detail view, mainly in elevation and partly in section, showing the yarn pushing mechanism for forcing the yarn under a spool at the beginning of the winding operation;

Figure 24 is an enlarged detail view showing the position of the pusher as it engages the yarn to force it under the spool between the same and one of the presser rolls;

Figure 25 is a view similar to Figure 24 showing the completion of the operation referred to in the description of Figure 24;

Figure 26 is a detail view in elevation showing the spool carrier for moving empty spools into operative position and also illustrates the operating mechanism of said spool carrier;

Figure 27 is a fragmentary detail view showing the means for supporting a clamp in operative position and elevating the same after the yarn cutting operation is completed;

Figure 28 is a fragmentary detail view showing the upper presser roll and means for controlling the movement thereof;

Figure 29 is a detail view illustrating the mechanism for controlling and permitting the vertical movement of the lower pair of presser rolls;

Figure 30 is a detail view illustrating one of the grippers and its controlling mechanism;

Figure 31 is a detail view showing the plunger which causes the closing movement of the gripper, and this figure also illustrates the operating mechanism for the plunger;

Figure 32 is a detail view, somewhat diagrammatically illustrating the position and operation of the grippers in relation to other parts of the machine;

Figure 33 is a fragmentary view in section on the line 33—33 of Figure 32;

Figure 34 is a detail view, partly in elevation and partly in section, of the clamp operating mechanism illustrated in Figure 5;

Figure 35 is a fragmentary view in plan, more or less diagrammatically illustrating the location of the several parts of the machine including the arrangement of yarn and spool winding mechanism;

Figure 36 is a broken view in side elevation illustrating the jacquard mechanism and its cooperating parts;

Figure 37 is a broken view in side elevation of one of the strips 288 and its cooperating parts;

Figure 38 is a view in sectional elevation of the jacquard mechanism;

Figure 39 is a fragmentary perspective view of an assemblage of strips 288 and the bar or straight edge 290.

In describing the machine, the mechanism thereof will be set forth as near as possible in the order or sequence of operation but it is of course to be understood that the parts are properly timed for co-ordination and the mechanisms are operating simultaneously but, nevertheless, a complete operation is carried out in sequence.

*General construction*

A represents the frame of the machine which supports two shafts running transversely of the machine. These shafts are given the reference numerals 1 and 271', respectively. Shaft 1 constitutes a cam shaft and contains a series of cams which control the operations of the several mechanisms of the machine.

This cam shaft 1 is located midway of the length of the machine, and forwardly of this shaft and in a higher plane the shaft 79 extends transversely of the machine and constitutes a drive gear shaft. Also the shaft 271' is located at the lower rear portion of the frame. The frame also supports a motor drive shaft 9 and these shafts will be referred to in the detailed description relative to the respective mechanisms, and for convenience of description it will be understood that the right hand end of the machine, shown in Figure 2, and the left hand end of the machine, shown in Figure 3, will be hereinafter referred to as the front of the machine and the opposite end as the rear of the machine.

Motion may of course be imparted to the machine through the medium of any suitable power, but I have shown for the purpose an electric motor 3, the shaft 9 of which is provided with a worm 4 (Fig. 2) transmitting motion to a worm wheel 5 on a shaft 6 extending longitudinally of the machine and having a worm 7 thereon meshing with a worm wheel 8 on cam shaft 1.

Motion is also transmitted to other parts of the machine with the motor 3 as a source of power, all of which will be more fully hereinafter described.

Figure 1:
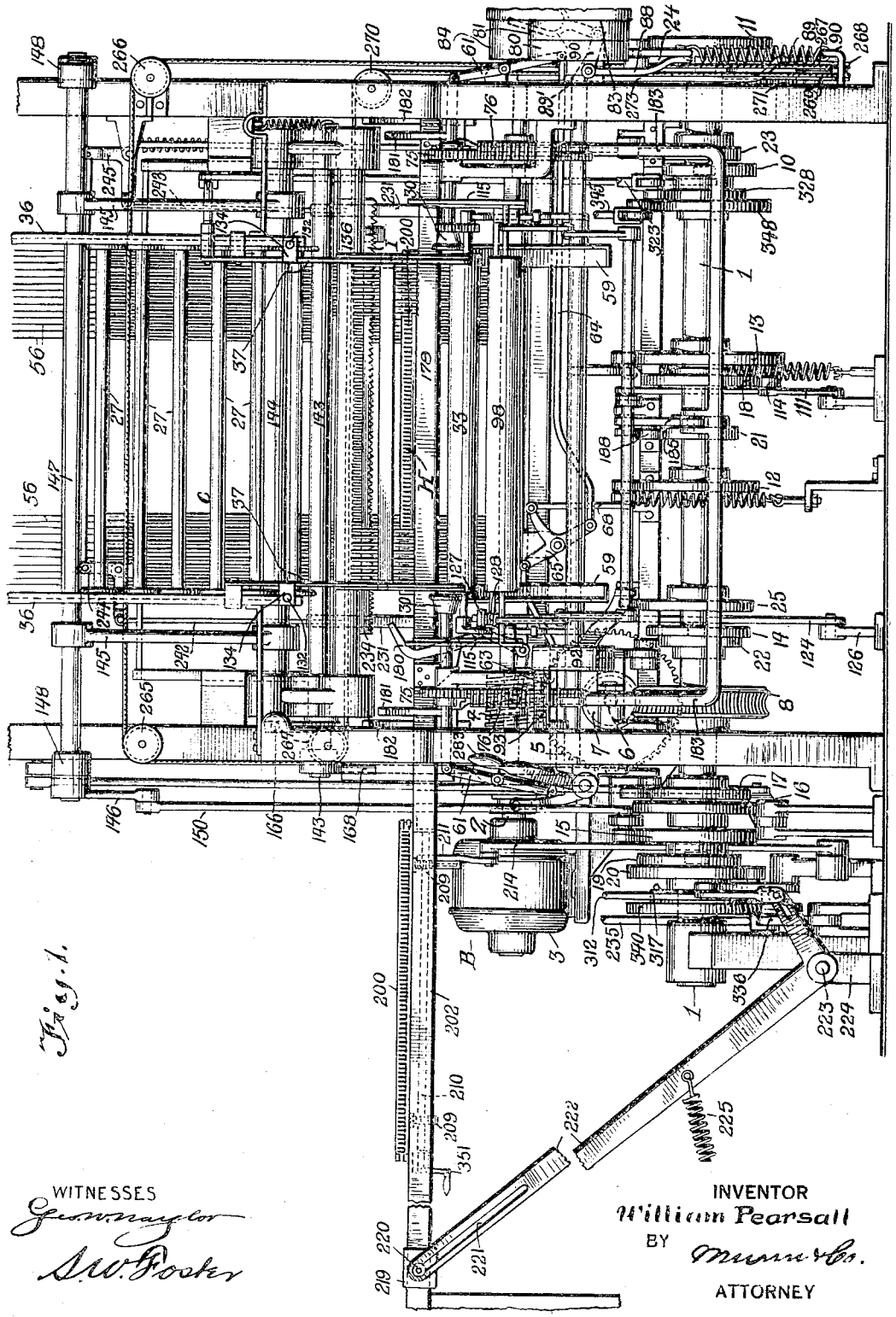
Figure 1 is a view in front elevation of the improved machine, the upper portion of the machine and the jacquard mechanism being omitted.

The cam shaft 1 has fixedly secured thereon a series of cams 10, 11, 12, 13, 14, 15, 16, 17, 18, 19, 20, 21, 22, 23, 24, 25, 317, 328, 340 and 348 (Fig. 1). Each of these cams controls the operation of a mechanism constituting a part of the machine and they shall be hereinafter referred to not only by their reference numerals but also by title as follows: 10 is the spool guide operating cam, 11 the belt shifter cam, 12 the spool operating cam, 13 the roller bearing operating cam, 14 the rack operating cam, 15 the gripper motion cam, 16 the gripper motion lifting cam, 17 the gripper closing cam, 18 the presser roll operating cam, 19 the magazine operating cam, 20 the plunger operating cam, 21 the clamp guide operating cam, 22 the clamp lock operating cam, 23 the cutter lifting cam, 24 the drum drive cam, 25 the brake operating cam, and cams 317, 328, 340 and 348 control the yarn positioning mechanism and jacquard mechanism governing the same.

The machine includes a number of essential co-operating mechanisms which are characterized as follows: B represents the driving mechanism, C the spool feeding and ejecting mechanism, D the winding mechanism, E the pressure mechanism, F the yarn pushing mechanism, G the gripper mechanism, H the clamp mechanism, I the cutting mechanism, and J the jacquard mechanism.

In addition to the above mechanisms, a transversely positioned reed or comb 352 is located in advance of the spool to separate the strands of yarn and guide them properly onto the spool.

Figure 2:
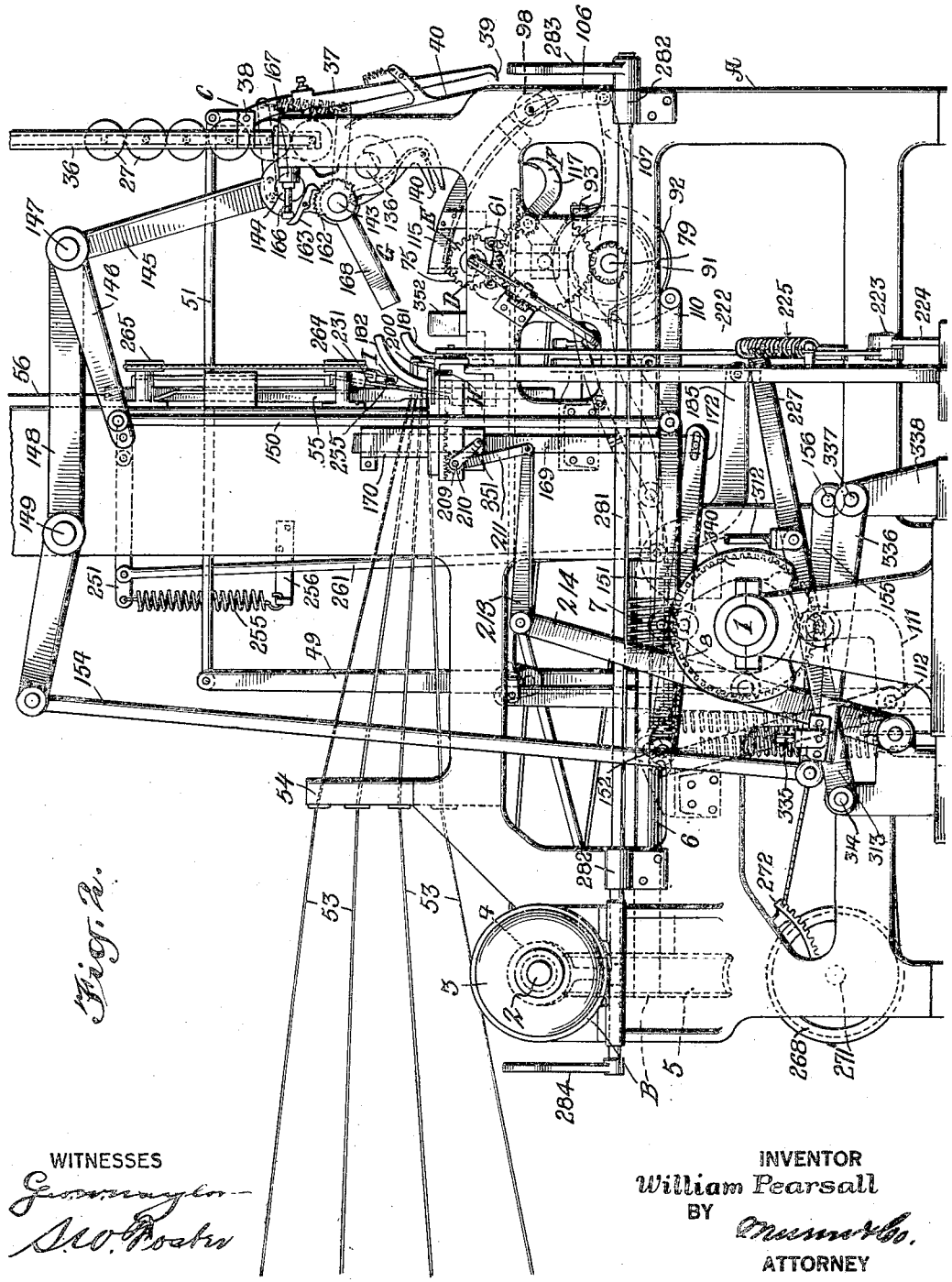
Figure 2 is a view in side elevation taken from the left side of Figure 1.

These reference characters B, C, D, E, F, G, H, I and J are applied to Figures 1, 2 and 3 of the drawings to indicate the general mechanisms, and details of these mechanisms are illustrated by the other figures of the drawings, and hence to avoid disfiguring these Figures 1, 2 and 3 it is necessary to omit some of the reference characters, which, however, can be found in the figures showing the details.

The frame A and the drive mechanism B having been described I will now proceed with the detailed description of the several mechanisms above referred to.

*Spool mechanism*

This mechanism is indicated generally by the reference character C and is shown in Figures 1 and 2 in relation to the other parts of the machine. For clearness of illustration attention is called to the detail views, Figures 17, 18, 19, 20, 21, 28, 29, 32 and 33.

The spools on which the yarn 53 is wound are indicated by the reference numeral 27, and each spool has a disk-like head 28 at each end with the usual short trunnion 29 projecting centrally therefrom.

A spool 27 is shown in Figures 20, 21, 28, 29 and 32 in operative position. Figures 18 and 20 show the spool in its initial position clamped between cup-like gripping heads 30 on alined and spaced spindles 31. When in this position the spool 27 is spaced from a pair of lower presser rolls 32 and 33 and is in position for operation, rotary motion being transmitted to the spool through the medium of the spindles 31 and mechanism to be hereinafter explained.

The lower presser rolls 32 and 33 are supported in vertically movable forks 34 mounted to move in suitable guides 35.

The empty spools 27 are supported in vertical series in a magazine 36 (Figs. 2 and 36) to which a depending spool guide 37 is pivotally connected. This spool guide 37 constitutes a pair of relatively rigid members, spaced apart, which are alike in construction and operation, as indicated in Figures 1 and 2 of the drawings, and as detailed in Figure 32.

Each of the bars or members constituting the spool guide is pivotally connected at its upper end to the magazine 36, as shown at 38, and at its lower end has a forwardly projecting finger 39 which co-operates with a movable or yieldable retainer strip 40 to hold a spool when the latter falls from the magazine.

This strip 40 has an angularly disposed arm 41 fixed thereto and pivotally connected to a perforated lug 42 on the member 37, and a coiled spring 43 connects the end of the arm 42 with a fixed pin 44 on member 37 which exerts an upward pull on the end of the arm and hence a downward pressure on the strip 40 to hold it in normal position but allow it to move to free a spool.

The upper end of each strip 40 is curved or flared, as shown at 45, so as to provide a sufficiently wide entrance for a spool to fall between the same and the member 37, in which respects the spool guide has the characteristics of a pocket. Each member 37 has a projection or shoulder 46 which functions to engage the lowermost spool 27 and force it through outlet grooves 48 in the rear wall of the magazine 36 and at the lower end thereof so that it will fall between the strips 40 and the members 37 and be supported in the lower ends of said members as the spool guide swings toward the rear of the machine to carry said spool into operative position between the gripper heads 30.

To limit the forward swing of the members 37 so as to insure an exact positioning of the spool, at least one of these members 37 carries a set screw 132 in a laterally offset lug 134 and said screw strikes a fixed part of the magazine 36 and can be adjusted to insure the exact operation.

The rearward movement of the members 37 releases the spool as the lower ends of the strips 40 constitute springs and will ride over the spool leaving the spool securely held by the heads 30. These members 37, constituting the spool guide, are caused to move through the medium of the spool guide operating cam 10 on cam shaft 1. This cam imparts pivotal movement to a lever 49 (Fig. 26) positioned vertically and pivotally supported between its ends on a fixed part of the frame, as shown at 50.

The upper end of this lever 49 is connected by a link 51 with a finger 52 constituting a fixed part of a member 37 and projecting above the pivot 38 of said member, as clearly indicated in Figure 26 of the drawings.

The spools 27 receive yarn 53 which is supplied from banks of spools or bobbins (not shown) and said yarn is fed to the machine in a vertical series of horizontal rows or tiers, the several rows or tiers being spaced apart by a grill or other analogous device 54 (Fig. 3), and the individual yarn in each vertical series is supported and held in proper spaced relationship by yarn carriers 55, one of which is shown in detail in Figure 11. There are of course a series of these yarn carriers extending across the machine, guided in their vertical movement and suspended from wires 287 and selectively elevated through the medium of jacquard mechanism, indicated generally by the reference character J, at the top of the machine frame, and which will be hereinafter described in detail.

Each yarn carrier 55 provides space for the separated strands of a yarn 53, and spring tongues 56, constituting a part of the yarn carrier, exert pressure on the yarn so as to permit the yarn to be fed forwardly but to prevent rearward or retrograde movement.

This yarn is drawn forwardly by grippers 135 into position over the spool when the latter is in operative position, and a predetermined length of yarn is wound on the spool, the ends of the yarn maintained in spaced relation and secured by clamps 200, the yarn being cut by suitable mechanism, all of which will be hereinafter described in detail.

In operation, the forward movement of an empty spool to replace a full spool will cause the completely wound spool to be moved off of the presser rollers 32 and 33, and said wound spool will roll down an outlet chute 59 to any desired position of rest.

It is to be understood that these spools are numbered or otherwise arranged in bins or the like so that they may be used on the loom in regular succession as each spool contains yarn for a design throughout the width of the carpet or rug, and the yarns on the respective spools when on the loom are brought into operation in regular succession to form the pattern in the carpet or rug.

Winding mechanism

In Figures 1, 2 and 3, I illustrate generally by the reference character D the winding mechanism, and reference is made to Figures 17, 18, 19, 20, 21, 28, 29 and 32 to illustrate this mechanism in detail.

The alined spindles 31, 31 have sliding and rotary mounting in brackets 60 and at their outer ends are swivelly connected to levers 61 (Fig. 18). The levers 61 are pivotally supported between their ends, as shown at 62 and at their lower ends are connected by rods 63 and 64 with a lever 65.

This lever 65 is of general T-shape and is pivotally supported between its ends, as shown at 66, on a bracket 67 fixed to the frame A, and rods 63 and 64 are connected to opposite ends of the lever. The third member of the lever projects at right angles to the main portion of the lever and from the center of the lever and is pivotally connected by a link 68 with one end of a cam lever 69. The other end of the cam lever is pivotally connected, as shown at 70, to a bracket 71 on the frame A, and intermediate its ends is provided with a roller 72 engaging the face of the spindle operating cam 12 on cam shaft 1.

A coil spring 73 exerts a downward pull on the cam lever 69, holding the roller 72 against the face of the cam, and said cam has a notched or recessed portion 74 into which the spring 73 draws the roller 72 to pull the lever 69 downwardly and draw the spindles 31 outwardly to release the spool 27.

When the roller 72 rides out of the recess 73 onto the face of the cam it forces the spindles 31 toward each other and moves the gripping heads 30 into contact with the ends of the spool to securely hold the spool in place.

Rotary motion is imparted to the spindles 31 and the spools 27 held thereby through the medium of pinions 75 secured to spindles 31 and meshing with idle gear wheels 76 on short shafts 77. The teeth of the gear wheels 76 are sufficiently wide to allow pinions 75 to move thereon without disengagement during the operation of releasing and gripping a spool.

Motion is transmitted to the idle gears 76 by pinions 78 on a shaft 79. This shaft 79 carries at one end fast and loose pulleys 80 and 81, respectively, with a third idle pulley 82 on which a driving belt 83 may be positioned. This belt 83 is driven by a pulley 84 on the shaft of the motor 3.

The belt is shifted from the loose to the fast pulley and vice versa through the medium of a pulley operating cam 11 on cam shaft 1. This cam 11 engages a roller 85 (Fig. 3) which is located intermediate the ends of the cam lever 86. This cam lever is pivoted at one end, as shown at 87, to frame A, and at its free end is connected to the lower end of a link 88.

A coil spring 89 is also connected to the free end of the lever 86, one end of said spring being secured to a clamp 90 which extends under a portion of frame A so that the spring tends to hold the roller 85 of lever 86 in engagement with the cam 11.

The link 88 above referred to is connected by a short link 89' (Fig. 1) with one end of a pivoted belt shifting fork 90 which straddles the belt 83 and shifts the same from the fast to the idle pulley and vice versa.

It is desirable during the cutting operation to stop the winding mechanism and at the time the belt is shifted to the loose pulley and also the momentum of the machine is checked through the medium of a brake operating mechanism illustrated in detail in Figure 22 and shown also in Figure 1 of the drawings.

The brake drum 91 is secured to shaft 79 and it is engaged by a brake band 92 secured at one end to a fixed part of the frame, as shown at 93, and at its other end connected to one end of a cam lever 94. The other end of this cam lever is pivotally connected, as shown at 95, to a bracket 96 and carries intermediate its ends a roller 97 operated by the brake operating cam 25 on cam shaft 1.

*Pressure mechanism*

Reference is particularly made to Figures 1, 2, 17, 18, 19, 21, 28 and 29 of the drawings. This pressure mechanism is indicated generally by the reference character E.

The spool 27 above referred to when in initial operating position is spaced from the presser rolls 32 and 33 below the same, and also from a presser roll 98 above the same, during the winding operation. These lower presser rolls 32 and 33, as above explained, are mounted in forks which slide vertically and are engaged by the bifurcated end 90 of a cam lever 100.

This lever 100 is pivotally supported on a depending bracket 101 secured to a fixed part of the frame A, and at one end is connected to a coil spring 102. This coil spring holds a roller 103 on lever 100 in engagement with what I term the roller bearing operating cam 13 on cam shaft 1.

It will be noted that the spring 102 normally holds the presser rolls 32 and 33 in their upward position having pressure but cushioned engagement with the spool 27, and said presser rolls are permitted to fall by gravity when the working face of the cam 13 causes the lever 100 to pivot, as most clearly shown in Figure 29.

A pinion 104 (Fig. 25) is secured to turn with one end of the lower presser roll 33 and engages a pinion 105 on one of the spindles 31 during the initial operation of the winding so as to compel said presser roll 33 to positively turn with the spool.

The upper presser roll 98 (Fig. 28) above referred to has rotary mounting at its ends in links 106 pivotally connected to levers 107. These levers 107 are fixed to a sleeve 108 on a rod or shaft 109 mounted in frame A, and at least one of the levers 107 has a downwardly projecting finger 109 which is connected by a link 110 with the longer end of a bell crank lever 111.

The bell crank lever 111 is pivotally mounted, as shown at 112, on a bracket support 113, and the shorter arm of said bell crank lever is of angular form and carries a roller 114 which engages the underside of the cam 18 on cam shaft 1.

The roller 98 is guided in its movement by curved tracks 115 and these tracks at their upper ends have openings 116 therein of a size sufficient to allow the trunnions at the ends of the roller 98 to move through the tracks and rest on the spool 27. As the spool is wound and becomes greater in diameter this upper presser roll 98 is elevated and at the proper time the cam 118 draws the same down the tracks 115 (Fig. 28) out of the way of the other operating parts of the machine.

*Yarn pushing mechanism*

This yarn pushing mechanism is indicated generally by the reference character F and reference is made to Figures 1, 2, 23, 24 and 25 of the drawings.

The yarn 53 to be wound on the spool 27 is drawn over said spool through the medium of pushing mechanism to be hereinafter described, and when the yarn is laid across the spool the ends of the yarn are pushed or tucked into the crotch between the spool and one of the lower presser roll 32 to begin the winding operation, and at this time the presser roll 32 is being positively driven through the medium of the pinions 104 and 105 above described.

This pushing mechanism includes a pair of hook-shaped arms 117 keyed to a rocker shaft 118, and at their free ends carrying a curved plate 119 which engages the yarn 53 and forces it between the spool 27 and presser roll 33, as clearly shown in Figures 24 and 25 of the drawings.

The presser roll 33 is preferably serrated, as shown at 120, to insure a frictional engagement with the yarn, and it is understood, as above explained, that these presser rolls 32 and 33 having yielding mounting so that when the presser plate 119 is forced between them the lower rolls will descend slightly and allow the yarn to be started in proper engagement with the spool to wind thereon, as shown in Figures 24 and 25.

It is advisable that the pushing mechanism be operated at least twice so as to absolutely insure proper winding and this is brought about through the medium of the cam 14 on cam shaft 1 having two operating faces 121 and 122. This cam 14 engages a roller 123 intermediate the ends of a cam lever 124, the lower end of said cam lever being pivotally connected, as shown at 125, with a support 126.

The upper end of the lever 124 is connected to a rack bar 127 engaging a pinion 128 on shaft 118. A coil spring 129 is secured at one end to an adjustable sleeve 130 secured to rack bar 127, and its other end is connected to a portion of the frame A, as shown at 131. This spring tends to move the pusher members 117 away from the spool and presser rolls and said pushing mechanism is caused to positively move toward the spool and presser rolls by the action of the cam 14, as clearly illustrated in Figure 23 of the drawings.

Gripper mechanism

This gripper mechanism is indicated generally by the reference character G and attention is particularly directed to Figures 1, 2, 3, 4, 30, 31 and 32 of the drawings.

Transversely throughout the machine a series of grippers are provided, each gripper adapted to grip and draw a strand of yarn 53 from a yarn carrier 55 and draw it over in position to fall upon the spool 27 when the latter is in normal position. As all of these grippers are alike a description of one will apply alike to all.

Each gripper, indicated generally by the reference numeral 57, comprises a fixed jaw 135 secured to a rod 136 extending transversely across the machine and supported at its ends in gripper carriers 137, these gripper carriers being fixedly secured by the arrangement of rods and shafts hereinafter described so that they move in unison and the whole assemblage of grippers are moved together.

In addition to the fixed jaw 135 each gripper has a movable jaw 138, the latter pivoted to the fixed jaw, as shown at 139, and both of said jaws at their free ends being roughened or serrated, as shown at 140, so as to effectually grip a strand of yarn when the jaws are moved together.

All of the movable jaws at their upper ends are bifurcated, as shown at 141, and receive a strip 142 fixed in a rocker shaft 143, the latter having turning movement in the gripper carriers 137. The gripper carriers are also connected at their upper ends by a fixed rod 144, and said carriers are secured to depending arms 145 of a bell crank lever 146.

One of these bell crank levers is pivotally supported at its angle, as shown at 147, on a pair of levers 148, said last-mentioned levers 148 being securely keyed between their ends on a shaft 149, mounted in a fixed part of the frame A.

The bell crank lever 146 is connected by a link 150 with one end of a cam lever 151. This cam lever is pivotally supported at its end, as shown at 152, and between its ends is provided with a roller 153 engaging the gripper motion cam 15 on the cam shaft 1. The lever mechanism last described causes the gripper to swing in an arc of a circle, indicated by the lower series of arrows in Figure 30.

The lever 148 is connected by a link 154 with one end of a cam lever 155, the latter being pivotally supported at one end, as shown at 156, in a support 157. The cam lever 155 has a roller 158 between its ends which engages the gripper motion lifting cam 16 on the cam shaft 1, and due to this cam 16 and its co-operating mechanism the grippers are caused to move in the path of the arrows above the lower curved arrow line shown in Figure 30.

The rocker shaft 143 above referred to, which operates the movable gripper jaws 138, has a crank arm 159 thereon (Fig. 4) which is connected by a coiled spring 160 with an arm 161 fixed to the member 145 of bell crank lever 146. This spring 160 tends to turn the rocker shaft in a direction to move the movable jaw away from the fixed jaw.

A ratchet segment 162 is secured on the rocker shaft 143 and is engaged by a pawl 163 pivotally connected between its ends, as shown at 164. A spring 165 connects the pawl with the rocker shaft so as to normally press said pawl into operative engagement with the teeth of the ratchet segment.

A stop screw 166 is adjustably mounted in a fixed part 167 of the machine frame and lies in the path of the rearward movement of the grippers so that when the grippers are moved to their extreme rearward position the ends of the pawls 163 engage the stop screws 166 and force the pawls out of engagement with the ratchet segment 162. When a pawl is released a weighted arm 168 on the rocker shaft 143 will move downwardly in a direction to cause the movable jaw to move away from the fixed jaw and release the strand of yarn 53 which has been moved by the gripper.

As the grippers move upwardly and then downwardly and throughout this movement in a direction rearwardly of the machine toward the yarn carriers 55 to position the grippers so as to engage the ends of the yarn, the weighted arm 168 will move into a position in the path of movement of a vertically movable plunger 169 mounted to slide in a guide 170.

The lower end of this plunger 169 has a slot and pin connection 171 with one end of a cam lever 172. This cam lever 172 is pivotally supported at one end, as shown at 173, and carries intermediate its ends a roller 174 engaging the gripper closing cam 17 on cam shaft 1.

The movement of the grippers defined by the arrows in Figure 30 is necessary for proper timing and also for proper positioning of the correlating parts of the machine to effect the proper operation.

Clamp mechanism

This mechanism is indicated generally by the reference character H and attention is called particularly to Figures 1, 2, 5, 6, 7, 8, 9, 10, 12, 27 and 34 of the drawings.

The clamps per se are illustrated most clearly in Figures 8, 9 and 10 of the drawings, and are given the reference numeral 200. In these figures it will be noted that each clamp comprises a pair of components or combs 175 and 176 slidably mounted relative to each other and the combs normally in alinement so as to permit the entrance of the strands of yarn 53 between the teeth of the combs when the clamp is moved upwardly from its normal position, that is, in a groove 177 in an elevator 178 extending transversely across the machine and in front of the yarn carriers 55.

The teeth of the combs normally project upwardly, as shown. The combs are so arranged that their ends are out of alinement, and the end of one comb engages a stop 179 on the elevator, and the end of the other comb is adapted to be engaged by a clamp operating arm 180 so that when pressure is applied to the arm one comb will be moved relative to the other to position the teeth of the combs out of alinement and clamp the yarn, as clearly indicated in Figure 8 of the drawings.

The elevator 178, which is in the form of a grooved track, is mounted at its ends in guides 181 and 182, respectively. These guides 181 and 182 at their lower portions are disposed vertically and at their upper portions curved concentrically to the forward part of the machine so that the elevator may move from a vertical to a somewhat horizontal position to allow the clamps to be drawn out of the elevator, as indicated in Figure 12 of the drawings.

A bail frame 183 (Fig. 27) is pivotally connected at its upper ends to the elevator 178, as shown at 184, and this bail frame at its lower intermediate portion is connected to one end of a cam lever 185, the other end of said cam lever being pivotally connected, as shown at 186, to a bracket 187 on a fixed part of frame A.

The cam lever 185 carries a roller 188 intermediate its ends which engages the elevator operating cam 21 on the cam shaft 1. It will be noted that this cam 21 has a two-stage operating face, one stage causing the elevator to lift and position the clamp on the yarn, and the other stage elevating the clamp to a position where it can be drawn out of the elevator.

The clamp operating arm 180 above referred to is pivotally supported between its ends, as shown at 189 (Fig. 5), on a bracket 190 depending from the elevator 178. The lower end of this arm 180 has a sliding engagement with one member of a bell crank lever 191 and the upper end has a spring 350. This bell crank lever 191 is pivoted at its angle, as shown at 192, on a fixed support 193, and the other member of said bell crank lever is connected by a link 194 with one end of a cam lever 195.

This cam lever 195 (Fig. 34) is pivotally supported between its ends, as shown at 196, and at its free end has a roller 197 engaging the clamp lock operating cam 22 on cam shaft 1. A coiled spring 198 connects the lever 195 to a fixed part of the machine and exerts pressure on the lever 195, tending to hold the roller 197 on the cam 22.

It will be noted that this cam 22 has a very short, sharp working face so that it gives a quick movement to the arm 180 to close or lock the clamp on the arm.

In a magazine 199 (Fig. 6) a plurality of clamps 200 are disposed side by side and movable on a horizontal support or table 201 constituting a part of the machine. At one end of the magazine 199 (Fig. 6) a guide rail 202 is provided having a groove 203 in its upper face into which a clamp 200 is forced from the magazine 199. This magazine has a stop 204 (Fig. 6) at its outlet end so positioned as to limit the movement of the series of clamps and allow one clamp to fall into the groove 203 of track 202. A follower 205 is movable in the magazine to feed the clamps and this follower is connected by a coupling 206 with a pair of rack bars 207 and moves in a slot 208 in the table or bottom of the magazine 199. One rack bar 207 is engaged by a pinion 209 located on a shaft 210 to which a depending arm 211 is secured. To return the follower to initial position a crank 351 (Fig. 6) is provided on the shaft 210 which may be manually turned to move the racks and follower.

A spring-pressed double beveled pawl 212 on the arm 211 engages the teeth of one pinion 209 so as to hold the pinion with sufficient force to compel it to turn the rack a desired distance, but by reason of the double beveled pawl a ratchet action is permitted under extreme movement of the arm so as to prevent any possibility of injury to the working parts if the throw of the arm is too great.

The arm 211 is connected by a link 213 with a cam lever 214 (Fig. 5). This cam lever is pivotally supported at its lower end, as shown at 215, to a fixed part 216 of the machine. Intermediate the ends of the lever 214 a roller 217 is provided which engages the magazine operating cam 19 on the cam shaft 1.

When a clamp 200 is deposited on the rail or track 202 it is in position for engagement by a wire or finger 218 (Figs. 5 and 7) which lies in the groove of the rail and at one end is adapted to engage an end of the clamp. This finger 218 is secured to a sliding block 219 mounted to slide on rail 202 and having a pin 220 thereon located in a long slot 221 in the long arm of a bell crank lever 222.

The bell crank lever 222 (Fig. 5) is pivotally supported at its angle, as shown at 223, in a bracket 224 constituting a fixed part of the machine, and said long arm of the lever has a coiled spring 225 operatively connected thereto so as to exert a pull on the lever tending to hold the lever in its normal or starting position.

The short end of the bell crank lever 222 has a slot and pin connection with a link 226 connected to one end of a cam lever 227 (Figs. 2 and 5), the other end of said cam lever being pivotally connected to a fixed part of the machine, as shown at 228. This lever 227 carries a roller 229 which engages the plunger operating cam 20 on cam shaft 1.

The part 218 (Fig. 7), which is above referred to as a finger, constitutes a plunger, so that when the upper end of the lever 222 is caused to move by action of the cam 20 the clamp 200 in the track or rail 202 will be moved along said rail and as this rail is in alinement with the groove of the elevator 178 a new clamp will be positioned in the elevator to replace a clamp which has been removed therefrom.

Cutting mechanism

This mechanism is indicated generally by the reference character I, and attention is especially directed to Figures 1, 2, 3, 12, 13, 14, 15, 16 and 32.

The cutting mechanism includes a horizontally disposed bar 230 (Figs. 12, 13 and 14) extending transversely of the machine and having sliding movement and guiding relationship to vertically disposed posts 231 which are supported on fixed arms 232 extending from the sides of the frame A.

This bar 230 carries at its lower edge a pair of spaced combs 233 and 234, respectively, the teeth of which project downwardly and between which a knife 235 is moved. The knife is angular in form and is secured to a depending arm 236, the latter being fixed to a plate 237 having its lower portion angular so as to provide an upwardly projecting flange 238 movable in a groove 239 in the bar 230, one wall of said groove being formed by the comb 233.

This plate 237 is secured to a block 240 having beveled sliding engagement with the beveled upper edge 241 of bar 230. The bar 230 is connected by rods 242 and 243 (Fig. 14) with bell crank levers 244 and 245, respectively, said bell crank levers pivotally connected at their angles to fixed parts of the frame A. The rods 242 and 243 are preferably provided with turnbuckles 248 intermediate their ends to adjust the length of the rods to exactly suit conditions.

As shown in perspective in Figure 16, the bell crank lever 245 is pivotally connected to a bracket 249, and the upwardly projecting arm of said bell crank lever is connected by a rod 250 with the bell crank lever 244, so that said bell crank levers are compelled to operate in unison and exert a lifting action on the bar 230 or allow the bar to move downwardly.

A horizontally disposed lever 251 (Fig. 16) is positioned at right angles to the rod 250 and is pivotally supported between its ends, as shown at 252, on a bracket 253, secured to a fixed part of the frame A. One end of this lever 251 is made with a finger 254 which extends under the normally horizontal member of the bell crank lever 245. The other end of the lever 251 is connected by coiled springs 255 with an arm 256 fixed to the frame A and exerts a downward pull on this end of the lever 251, tending to elevate the bar 230. The downward movement of the spring-pulled end of lever 251 is controlled by the cutter lifting cam 23 on cam shaft 1.

Above the cam 23 a cam lever 257 is located and pivotally connected at one end, as shown at 258, to a bracket 259 on a fixed part of frame A, and this lever carries intermediate its ends a roller 260 which engages the face of the cam.

A link 261 connects the free end of the cam lever 257 with the lever 251 at a point adjacent the spring-connected end of said lever 251. Normally the bar 230 and the cutter mechanism constituting a part thereof is held in elevated position by the spring 255 and the cam 23 causes said bar 230 to lower into cutting position with the teeth of the combs 233 and 234 receiving the strands of yarn 53 when the winding operation above described is ended. This cutting position is shown clearly in Figure 12 of the drawings.

When the cutting mechanism is in the position shown in Figure 12 the knife 235 is at one end of the bar 230, and to cause this knife to reciprocate between the combs 233 and 234 to sever the strands of yarn I employ a mechanism which will now be described.

The block 240 above referred to is provided at its opposite ends with eyes 262. To these eyes 262 the opposite ends of a rope or other flexible connecting device 263 are secured. One run of the rope 263 extends from one eye 262, around idle pulleys 264 and 265 on one side of the machine as shown in Figure 14, thence transversely across the machine around an idle roller 266 at the other side of the machine, thence downwardly and around an idle roller 267 at the lower portion and at the same side of the machine, thence around a drive pulley 268 mounted on the drive shaft 2 extending transversely of the machine, thence around a pulley 269 located opposite pulley 267, thence upwardly and around an idle pulley 270, and thence to and secured to the eye 262 of the opposite end of block 240.

On a short shaft 271' a pinion 271 is secured and is engaged by a segment 272 located at one end of a lever 273. This lever 273 is pivotally supported between its ends, as shown at 274, and at its upper end is connected by a link 275 with the upper end of a cam lever 276. This cam lever is pivotally supported at its lower end, as shown at 277, on a fixed part of frame A, and the upper end of the lever is connected by a coiled spring 278 with a bracket 279 on frame A so that said spring 278 exerts a pull tending to swing the lever 273 to operate and cause the knife to reciprocate back and forward to sever the yarn when permitted by the knife operating cam 24 on cam shaft 1 (Fig. 3). This cam 24 is a quick acting cam and engages a roller 280 on the cam lever 276, causing a quick reciprocation of the knife during the cutting operation.

It will be noted, particularly by reference to Figure 12, that during this cutting operation the strands of yarn 53 are held against lateral displacement not only by reason of the fact that they are positioned in the teeth of the combs 233 and 234 but they are also projected through the combs of the clamp 200, the latter having been moved upwardly.

The stopping and starting of the drive motor 3 of the machine is controlled through the medium of a shaft 281 (Fig. 2) extending longitudinally of the machine at one side thereof, as shown in Figure 2, and supported in suitable bearings 282. This shaft is provided with crank handles 283 and 284 at its respective ends, and it is of course to be understood that any means may be provided in any suitable location for electrically or otherwise controlling the starting and stopping of the motor in the event of accident, such, for example, as the breaking of yarn strands and the necessity of attaching new strands where bobbins or spools have been exhausted.

Jacquard mechanism

This mechanism is indicated generally by the reference character J and attention is directed particularly to Figures 3a, 36, 37, 38 and 39 of the drawings.

My improved jacquard mechanism is supported mainly within a casing 285 at the top of frame A and includes a plurality of vertical series of push needles 286 (Fig. 38), there being a vertical series of these needles for each yarn carrier 55.

Each yarn carrier is suspended by a wire 287 from a vertically movable strip 288, and it is to be understood that these strips 288 (Fig. 39) are suitably guided in their vertical movements but are held against lateral displacement.

Each strip 288 carries a vertical series of horizontally disposed pins 289 (Fig. 38) adapted to register with the ends of the push needles 286. These pins 289 are longer than the strip 288 is wide so that they project from the edges of these strips, and when the push needles are moved to the left of Figure 38 they force the pins 289 to the left and in the path of movement of a bar 290, which is commonly known in the trade as a straight edge.

The push needles 286 project through a guide bar 291 and have coiled springs 292 thereon tending to hold said needles in normal position and return them to such position. These springs 292 are fixed at one end to the needles and at their other ends bear against the guide bar 291.

A moveable grill 293 engages the right hand ends of the needles shown in Figure 38 and forces such needles to the left as are in alinement with fingers 294 on the grill.

The reference character 295 indicates vertically movable reader needles, and each of these reader needles is operatively connected to a push needle as, for example, each reader needle has an eye 297 receiving a push needle.

The reader needles are movably mounted in a suitable guide plate 299 at their upper ends, and at their lower ends are positioned over a jacquard cylinder 300. This cylinder 300 is of the square or angular type having recesses 301 therein and adapted to receive jacquard cards 302 thereon. When the cylinder 300 moves upwardly, the perforations in the cards 302 will allow certain of the reader needles to move into the recesses 301 but will elevate the reader needles where there are no perforations in the card, causing the right hand ends of the push needles to be moved out of alinement with fingers 294 of the grill 293, as indicated in dotted lines in Figure 38.

It is of course to be understood that, when the pins 289 have been projected by the push needles, the upward movement of the straight edge or bar 290 will elevate the respective yarn carriers so as to present to the grippers 57, above referred to, a horizontal row or series of the yarns of selected colors.

The jacquard mechanism above described is operated and controlled through the medium of a set of cams and co-operating mechanism which will now be described in detail, particular reference being had to Figures 36 and 38 of the drawings.

The jacquard cylinder 300 has trunnions 303 at its ends which have longitudinal movement in slots 304 in casing 285, and these trunnions are positioned in openings in vertically movable bars 305 which are slidably mounted in brackets 306 on the sides of casing 285.

On opposite sides of the casing 285 levers 307 are secured on a shaft 308 extending through the casing, and these levers at one end have slot and pin connection 309 with the lower ends of bars 305. At least one of these levers at its end (opposite to that end which is connected to the bar) is connected by a coil spring 310 with a fixed finger 311 on casing 285, exerting an upward pull on both levers to cause a downward movement of the cylinder and to hold the cylinder in normal position.

One of these levers 307 is connected by a rod 312 with one end of a cam lever 313. This cam lever 313 is pivoted at its end, as shown at 314, on bracket 315, and has a cam roller 316 engaging a cam 317 on cam shaft 1.

The grill 293 is moved through the medium of a crank arm 318 keyed to a shaft 319 at the upper portion of casing 285, and this crank arm 318 has a slot and pin connection 320 with a push block 321 at the rear of the grill 293.

A lever 322 is secured to the shaft 319 and connected by a rod 323 with the free end of a cam lever 324. This cam lever 324 is pivotally supported at one end, as shown at 325, on a bracket or fixed part 326 of frame A. Lever 324 has a cam roller 327 thereon engaging a cam 328 on cam shaft 1.

The straight edge or bar 290 above referred to is movable in vertical slots 329 in the side walls of casing 285 and secured to vertically movable bars 330 mounted to slide in brackets 331 on opposite sides of the casing.

A pair of levers 332 is pivotally secured to a cross shaft 333 on frame A and at one end have adjustable screws or other abutments 334 to engage the lower ends of the bars 330 and impart a lifting movement to the straight edge or bar.

One of the levers 332 is connected by a link 335 with one end of a cam lever 336. This cam lever 336 is pivotally supported at one end, as shown at 337, upon a bracket or other fixed support 338 of the machine frame. The lever 336 carries a roller 339 engaging a cam 340 on cam shaft 1.

After the straight edge 290 has moved vertically to position the yarn carriers 55 it remains in this position throughout a winding operation and then moves downwardly, and at this time a crank arm or pair of crank arms 341 is moved by a shaft 342 to force a pusher plate 343 carried by said arms against the projecting pins 289 and force all of said pins to their inward position, which is the position shown in full lines in Figure 38.

The shaft 342 is mounted at the top of casing 285 and has a crank arm 344 projecting therefrom and connected by a rod or link 345 with the free end of a cam lever 346. This cam lever 346 is pivotally supported at one end and has a roller 347 thereon engaging a cam 348 on cam shaft 1.

It is of course to be understood that the several cams above described in connection with the jacquard mechanism are so shaped as to give the desired length of movement and the proper timing of movement to the several parts of the mechanism, and in order to insure a proper adjustment, turnbuckles 349 are utilized to connect sections of the rods or links, as clearly shown in Figure 36.

Operation

As the operation of each of the several mechanisms has been set forth in connection with the description thereof, it is not necessary to enlarge upon these operations but in order that a proper knowledge of the general sequence of operations may be had I will point out the operation of the machine as a whole.

First, it is to be understood that the yarns 53 (Fig. 35) fed from banks of spools or bobbins or from any other source are supported by the yarn carriers 55 (Figs. 2, 3, 4, 11 and 32), each yarn carrier supporting a vertical series of yarns, and the yarn carriers are so arranged that they jointly support a series of superimposed horizontal rows or tiers of yarn.

It is to be understood that each horizontal row or tier of yarn is of the same color and that there will be as many horizontal rows or tiers as there are different colors in the patterns to be made, and that each horizontal row of yarn is of a color different from the other rows.

Assuming that a spool 27 (Figs. 21, 24 and 32) is in operative position and a clamp 200 is in position in the elevator 178, the grippers 57 have moved toward the rear of the machine and grip the projecting ends of yarn 53 which are in a horizontal plane across the machine. As above explained, the jacquard mechanism, indicated generally by the reference character J, has previously elevated selectively several of the yarn carriers 55 so that in the horizontal plane of yarn grasped by the grippers 57 there will be different colors of yarn in accordance with the pattern. The grippers draw the yarn through the yarn carriers and place the yarn over the spool 27.

The presser rolls 32 and 33 and 98, having moved into operative position, the yarn is held across the spool while the pusher plate 119 is forced between the spool and the presser roll 33 to start the yarn properly on the spool, and this operation of the pusher plate 119 is repeated to insure the proper initial winding engagement of the yarn with the spool.

The winding mechanism, indicated generally by the reference character D carries out the winding operation to position the desired length of yarn on the spool, and it is to be understood that the machine is so controlled that a single revolution of the cam shaft 1 constitutes a complete operation of the machine.

When the spool is almost completely wound, the clamp 200 is closed by the member 180 so as to cause the clamp to grip the strands of yarn and hold them separated.

The cutter mechanism, indicated generally by the reference character I, moves downwardly the strands of yarn being separated by the combs 233 and 234, and the knife 235 is caused to reciprocate between said plates to sever the strands of yarn at a short distance from the edges of the yarn carriers 55 so as to leave the projecting ends of the yarn for engagement by the grippers during the next operation.

During this cutting operation it is necessary to stop the winding of the yarn on the spool, at least while the knife is making a complete movement, and hence the spool operating belt 83 is shifted from the fast pulley 81 to one of the loose pulleys, and the brake lever 94 operated to check the momentum of the winding mechanism. At the end of the cutting operation, the cutting mechanism as a whole is elevated, and the clamp 200 is moved upwardly by the elevator 178 to position the same so that it may be drawn out of the elevator and up to the spool and remains attached to the yarn until the spool is used on the loom.

As the spool is completely wound with the clamp thereon, a new spool is moved into position by the spool guide and ejecting mechanism, indicated generally by the reference character C, and the operation above described is repeated.

It will thus be seen that the operation of selecting yarn of proper colors and in proper arrangement relative to a horizontal bank or series is entirely automatic in my improved machine as well as the means for winding said yarn on a spool and carrying out the complete setting operation, as it is commonly known in the trade, so that I can provide in my improved machine properly wound spools for use in making the design of a rug or carpet or other analogous article, and perform the entire work automatically. This not only results in a great saving of time and labor but it insures absolute accuracy.

While I have illustrated what I believe to be a preferred embodiment of my invention, it is obvious that various changes and alterations might be made in the general form of the parts described without departing from my invention and hence I do not limit myself to the precise details set forth but consider myself to make such changes and alterations as fairly fall within the spirit and scope of the appended claims.

I claim:

1. An automatic setting machine, including spool turning means, gripper means engaging the yarn and drawing it over the spool, and pusher means timed with the gripper means to impose the yarn upon the spool when the gripper means passes out of range of said pusher means and spool.

2. An automatic setting machine, including spool turning means, means for directing selected colored yarns to the spool, a normally open clamp for engaging the yarn and holding the strands separated on the spool, and automatic means for closing the clamps to grip the yarn.

3. An automatic setting machine, including spool turning means, means for directing selected colored yarns to the spool, automatically timed means compelling the yarn to wind on the spool, means for cutting the yarn when a spool is almost completely wound, and means timing the action of each of said means to occur successively.

4. An automatic setting machine, including spool turning means, means for directing selected colored yarns to the spool, means for feeding spools to operative position and ejecting wound spools from the machine, a clamp engaging the yarn and holding the strands separated, and automatic means for closing the clamps to grip the yarn.

5. An automatic setting machine, including spool turning means, means for directing selected colored yarns to the spool, a mechanically positioned and operated portable clamp engaging the yarn and holding the strands separated, automatic means for feeding the clamps to operative position on the yarn, and automatic means for closing the clamps to grip the yarn.

6. An automatic setting machine, including spool turning means, means for directing selected colored yarns to the spool, a mechanically positioned and operated portable clamp engaging the yarn and holding the strands separated, automatic means for feeding the clamps to operative position on the yarn, automatic means for closing the clamps to grip the yarn, and means for cutting the yarn when a spool is almost completely wound.

7. An automatic setting machine, including spool turning means, means for directing selected colored yarns to the spool, a mechanically positioned and operated portable clamp engaging the yarn and holding the strands separated, automatic means for feeding the clamps to operative position on the yarn, automatic means for closing the clamps to grip the yarn, a cam shaft, and cams thereon controlling the operation of all of said means.

8. An automatic setting machine, including spool turning means, grippers for drawing selected colored yarns to the spool, and pusher mechanism forcing the yarn to initial position for winding on the spool.

9. An automatic setting machine, including spool turning means, grippers for drawing selected colored yarns to the spool, spool feeding and ejecting means, and pusher mechanism forcing the yarn to initial position for winding on the spool.

10. An automatic setting machine, including spool turning means, grippers for drawing selected colored yarns to the spool, movable presser rolls engaging the yarn while winding on the spool, and pusher mechanism forcing the yarn to initial position for winding on the spool.

11. An automatic setting machine, including spool turning means, means for directing selected colored yarns to the spool, gripper means engaging the yarn and drawing it over the spool, and pusher mechanism forcing the yarn to initial position for winding on the spool.

12. An automatic setting machine, including spool turning means, grippers for drawing selected colored yarns to the spool, a clamp engaging the yarn and holding the strands separated, and pusher mechanism forcing the yarn to initial position for winding on the spool while the strands are separated.

13. An automatic setting machine, including spool turning means, grippers for drawing selected colored yarns to the spool, automatic means feeding clamps to operative position on the yarn, and pusher mechanism forcing the yarn to initial position for winding on the spool.

14. An automatic setting machine, including spool turning means, grippers for drawing selected colored yarns to the spool, a clamp for engaging the yarn and holding the strands separated, automatic means for closing the clamps to grip the yarn, and pusher mechanism forcing the yarn to initial position for winding on the spool.

15. An automatic setting machine, including spool turning means, grippers for drawing selected colored yarns to the spool, means for cutting the yarn when a spool is almost completely wound, and pusher mechanism forcing the yarn to initial position for winding on the spool.

16. An automatic setting machine, including spool turning means, grippers for drawing selected colored yarns to the spool, means for positioning the ends of the cut yarn in a position to be gripped, grippers movable to and from said position to pull the yarn to the spool, and pusher mechanism forcing the yarn to initial position for winding on the spool.

17. An automatic setting machine, including spool turning means, grippers for drawings selected colored yarns to the spool, jacquard mechanism controlling the yarn selecting means, and pusher mechanism forcing the yarn to initial position for winding on the spool.

18. An automatic setting machine, including spool turning means, grippers for drawing selected colored yarns to the spool, spool feeding and ejecting means, movable presser rolls engaging the yarn while winding on the spool, and pusher mechanism forcing the yarn to initial position for winding on the spool.

19. An automatic setting machine, including spool turning means, means for directing selected colored yarns to the spool, spool feeding and ejecting means, gripper means engaging the yarn and drawing it over the spool, and pusher mechanism forcing the yarn to initial position for winding on the spool.

20. An automatic setting machine, including spool turning means, grippers for drawing selected colored yarns to the spool, spool feeding and ejecting means, a clamp engaging the yarn and holding the strands separated, and pusher mechanism forcing the yarn to initial position for winding on the spool.

21. An automatic setting machine, including spool turning means, grippers for drawing selected colored yarns to the spool, mechanically positioned and operated clamps, spool feeding and ejecting means, automatic means for feeding the clamps to operative position on the yarn, and pusher mechanism forcing the yarn to initial position for winding on the spool.

22. An automatic setting machine, including spool turning means, grippers for drawing selected colored yarns to the spool, spool feeding and ejecting means, a clamp engaging the yarn and holding the strands separated, automatic means for closing the clamps to grip the yarn, and pusher mechanism forcing the yarn to initial position for winding on the spool.

23. An automatic setting machine, including spool turning means, grippers for drawing selected colored yarns to the spool, spool feeding and ejecting means, means for cutting the yarn when a spool is almost completely wound, and pusher mechanism forcing the yarn to initial position for winding on the spool.

24. An automatic setting machine, including spool turning means, grippers for drawing selected colored yarns to the spool, spool feeding and ejecting means, means for positioning the ends of the cut yarn for engagement by the movable grippers which pull the yarn to the spool, and pusher mechanism forcing the yarn to initial position for winding on the spool.

25. An automatic setting machine, including spool turning means, grippers for drawing selected colored yarns to the spool, spool feeding and ejecting means, jacquard mechanism controlling the yarn selecting means, and pusher mechanism forcing the yarn to initial position for winding on the spool.

26. An automatic setting machine, including spool turning means, grippers for drawing selected colored yarns to the spool, a clamp engaging the yarn and holding the strands separated, automatic means for feeding the clamps to operative position on the yarn, automatic means for closing the clamps to grip the yarn, and pusher mechanism forcing the yarn to initial position for winding on the spool.

27. An automatic setting machine, including spool turning means, grippers for drawing selected colored yarns to the spool, a clamp engaging the yarn and holding the strands separated, automatic means for feeding the clamps to operative position on the yarn, automatic means for closing the clamps to grip the yarn, means for cutting the yarn when a spool is almost completely wound, and a pusher mechanism forcing the yarn to initial position for winding on the spool.

28. An automatic setting machine, including spool turning means, grippers for drawing selected colored yarns to the spool, a cam shaft, cams thereon controlling the operation of all of said means, and pusher mechanism forcing the yarn to initial position for winding on the spool.

29. An automatic setting machine, including spool turning means, grippers for drawing selected colored yarns to the spool, spool feeding and ejecting means, a cam shaft, cams thereon controlling the operation of all of said means, and pusher mechanism forcing the yarn to initial position for winding on the spool.

30. An automatic setting machine, including spool turning means, grippers for drawing selected colored yarns to the spool, movable presser rolls engaging the yarn while winding on the spool, a cam shaft, cams thereon controlling the operation of all of said means, and pusher mechanism forcing the yarn to initial position for winding on the spool.

31. An automatic setting machine, including spool turning means, means for directing selected colored yarns to the spool, gripper means engaging the yarn and drawing it over the spool, a cam shaft, cams thereon controlling the operation of all of said means, and pusher mechanism forcing the yarn to initial position for winding on the spool.

32. An automatic setting machine, including spool turning means, grippers for drawing selected colored yarns to the spool, a clamp engaging the yarn and holding the strands separated, a cam shaft, cams thereon controlling the operation of all of said means, and pusher mechanism forcing the yarn to initial position for winding on the spool.

33. An automatic setting machine, including spool turning means, grippers for drawing selected colored yarns to the spool, mechanically positioned and operated portable clamps, automatic means for feeding the clamps to operative position on the yarn, a cam shaft, cams thereon controlling the operation of all of said means, and pusher mechanism forcing the yarn to initial position for winding on the spool.

34. An automatic setting machine, including spool turning means, grippers for drawing selected colored yarns to the spool, a clamp for engaging the yarn and holding the strands separated, automatic means for closing the clamps to grip the yarn, a cam shaft, cams thereon controlling the operation of all of said means, and pusher mechanism forcing the yarn to initial position for winding on the spool.

35. An automatic setting machine, including spool turning means, grippers for drawing selected colored yarns to the spool, means for cutting the yarn when a spool is almost completely wound, a cam shaft, cams thereon controlling the operation of all of said means, and pusher mechanism forcing the yarn to initial position for winding on the spool.

36. An automatic setting machine, including spool turning means, grippers for drawing selected colored yarns to the spool, means for positioning the ends of the cut yarn for engagement by the movable grippers which pull the yarn to the spool, a cam shaft, cams thereon controlling the operation of all of said means, and pusher mechanism forcing the yarn to initial position for winding on the spool.

37. An automatic setting machine, including spool turning means, grippers for drawing selected colored yarns to the spool, jacquard mechanism controlling the yarn selecting means, a cam shaft, cams thereon controlling the operation of all of said means, and pusher mechanism forcing the yarn to initial position for winding on the spool.

38. An automatic setting machine, including spool turning means, grippers for drawing selected colored yarns to the spool, spool feeding and ejecting means, movable presser rolls engaging the yarn while winding on the spool, a cam shaft, cams thereon controlling the operation of all of said means, and pusher mechanism forcing the yarn to initial position for winding on the spool.

39. An automatic setting machine, including spool turning means, means for directing selected colored yarns to the spool, spool feeding and ejecting means, gripper means engaging the yarn and drawing it over the spool, a cam shaft, cams thereon controlling the operation of all of said means, and pusher mechanism forcing the yarn to initial position for winding on the spool.

40. An automatic setting machine, including spool turning means, grippers for drawing selected colored yarns to the spool, spool feeding and ejecting means, a clamp engaging the yarn and holding the strands separated, a cam shaft, cams thereon controlling the operation of all of said means, and pusher mechanism forcing the yarn to initial position for winding on the spool.

41. An automatic setting machine, including spool turning means, grippers for drawing selected colored yarns to the spool, spool feeding and ejecting means, automatic means feeding clamps to operative position on the yarn, a cam shaft, cams thereon controlling the operation of all of said means, and pusher mechanism forcing the yarn to initial position for winding on the spool.

42. An automatic setting machine, including spool turning means, grippers for drawing selected colored yarns to the spool, spool feeding and ejecting means, a clamp engaging the yarn and holding the strands separated, automatic means for closing the clamps to grip the yarn, a cam shaft, cams thereon controlling the operation of all of said means, and pusher mechanism forcing the yarn to initial position for winding on the spool.

43. An automatic setting machine, including spool turning means, grippers for drawing selected colored yarns to the spool, spool feeding and ejecting means, means for cutting the yarn when a spool is almost completely wound, a cam shaft, cams thereon controlling the operation of all of said means, and pusher mechanism forcing the yarn to initial position for winding on the spool.

44. An automatic setting machine, including spool turning means, grippers for drawing selected colored yarns to the spool, spool feeding and ejecting means, means for positioning the ends of the cut yarn for engagement by movable grippers which pull the yarn to the spool, a cam shaft, cams thereon controlling the operation of all of said means, and pusher mechanism forcing the yarn to initial position for winding on the spool.

45. An automatic setting machine, including spool turning means, grippers for drawing selected colored yarns to the spool, spool feeding and ejecting means, jacquard mechanism controlling the yarn selecting means, a cam shaft, cams thereon controlling the operation of all of said means, and pusher mechanism forcing the yarn to initial position for winding on the spool.

46. An automatic setting machine, including spool turning means, grippers for drawing selected colored yarns to the spool, a clamp engaging the yarn and holding the strands separated, automatic means for feeding the clamps to operative position on the yarn, automatic means for closing the clamps to grip the yarn, a cam shaft, cams thereon controlling the operation of all of said means, and pusher mechanism forcing the yarn to initial position for winding on the spool.

47. An automatic setting machine, including spool turning means, grippers for drawing selected colored yarns to the spool, a clamp engaging the yarn and holding the strands separated, automatic means for feeding the clamps to operative position on the yarn, automatic means for closing the clamps to grip the yarn, means for cutting the yarn when a spool is almost completely wound, a cam shaft, cams thereon controlling the operation of all of said means, and pusher mechanism forcing the yarn to initial position for winding on the spool.

48. An automatic setting machine, including spool mounting and turning means, means for directing selected colored yarns to the spool, a clamp magazine, a track on which the clamps are fed from the magazine, means for moving a clamp along the track, an elevator receiving a clamp from the track and locating it below the strands of yarn, and means guiding the elevator in its upward movement whereby the clamps are moved from a vertical to an angular position so as to be drawn out of the elevator with the yarn.

49. An automatic setting machine, including spool mounting and turning means, means for directing selected colored yarns to the spool, a clamp magazine, a track on which clamps are fed from the magazine, means for moving a clamp along the track, an elevator receiving a clamp from the track and locating it below the strands of yarn, means for guiding the elevator in its upward movement whereby the clamps are moved from a vertical to an angular position so as to be drawn out of the elevator with the yarn, and means for operating the clamp to grip the yarn when the clamp is moved upwardly by the elevator.

50. An automatic setting machine, including spool turning means, means for directing spools into operative relation to the turning means, means for directing selected yarns to the spool, a yarn spacing clamp operated by the machine to engage the yarn, and means for cutting the yarn near the clamp, said turning means functioning to draw the clamp up to the spool.

51. An automatic setting machine, including spool turning means, means for directing spools into operative relation to the turning means, a magazine for yarn spacing clamps, means for moving a clamp to a position to engage the yarn, means for cutting the yarn adjacent the clamp, said spool turning means functioning to draw the clamp up to the spool.

52. An automatic setting machine, including spool turning means, means for drawing selected yarns to a spool in operative engagement with said means, an elevator, a yarn spacing clamp in the elevator, means for operating the clamp to clamp the yarn, means for cutting the yarn adjacent the clamp, and means for moving the elevator to a position to release the clamp and permit the clamp to be drawn up to the spool by the spool turning means.

53. An automatic setting machine, including spool turning means, a movable spool magazine for directing spools into operative relation to the turning means and ejecting the wound spools from said position, means for directing selected yarns to the spool, means for causing the yarn to wind on the spool, a clamp holding device, a clamp in the device of toothed formation through which the yarn is drawn, means for operating the clamp to cause the same to clamp and space the yarn apart, and means for operating the clamp to hold the device to release the clamp and permit it to be drawn up to the spool.

54. In a setting machine, a magazine to contain a series of spools having trunnions, said magazine having outlet grooves at which the series is sustained by engagement of the trunnions of the lowermost spool, a pivoted spool guide, a projection on the spool guide substantially in line with the lowermost spool, and means to swing the spool guide thus to force the projection against the lowermost spool for forcing the trunnions out of said slots and to place the spool guide in position to receive said spool.

55. In a setting machine, a magazine to contain a spool, and a spool guide for dislodging and catching the spool, said guide comprising a movable member having a projecting finger, and a yieldable strip movably mounted on said member cooperating with said finger.

56. In a setting machine, spool-winding mechanism, an empty spool magazine, and means to first dislodge an empty spool from the magazine, second carry it to the winding mechanism, and third substitute the empty spool for a spool previously filled by the winding mechanism.

57. In a setting machine, winding mechanism to rotate a spool and wind yarn thereon, means to stop the winding mechanism thus to stop rotating the spool, cutting mechanism and means for operating it to sever the yarn upon stopping of the spool, and brake mechanism applied to the winding mechanism upon stopping thereof to hold the spool immovable.

58. In a setting machine, rotatable spindles for rotating a spool to wind yarn thereon at a fixed winding position, a presser roll to bear against the yarn, a slidable support on which the roll has bearing, a pivoted lever engaging the support, a spring connected with the lever holding the presser roll against the yarn providing a cushioned engagement of the roll with the yarn to compensate for the increasing layers of yarn, and a cam having a lobe to rock the lever on its pivot against the tension of the spring to relieve the pressure of the roll from the yarn prior to removal thereof from the winding position.

59. In a setting machine, rotatable spindles for rotating a spool to wind yarn thereon at a fixed winding position, a pair of presser rolls to bear against yarn wound on the spool, a supporting fork for the rolls mounted to slide away from the spool by gravity, an actuating cam having a lobe, a pivoted lever having a roller riding on the cam face and an end engaging the fork, and a spring connected with the lever holding the roller against the cam and limiting the movement of the fork and rollers toward the spool but providing a yielding connection for the recession of the presser rolls from the spool under increasing layers of yarn, said cam lobe further rocking the lever to completely displace the presser rolls when the spool is filled.

60. In a setting machine, winding mechanism for rotating a spool delivered thereto, a gripper for laying an end of yarn across the spool, a presser roll, a track for the presser roll, a movable lever having a pivoted link in which the roll has rotary mounting, and means to move the roll along the track into a position for the gravitation of the roll upon the yarn.

61. In a setting machine, winding mechanism to which rotation is imparted to a spool delivered thereto, a track directed to the winding mechanism, a presser roll having trunnions riding on the track, a movable lever having a pivoted link on which the presser roll has rotary mounting, and a cam having means for moving the lever first to move the roll in one direction along the track for gravitation upon yarn adapted to be wound on the spool, second to move the roll in the opposite direction along the track when the spool is filled.

62. In a setting machine, winding mechanism to impart rotation to a spool delivered thereto, a track having an opening directed to the spool, a presser roll having a trunnion displaced in said opening in the direction of the track under the increasing depth of yarn beneath the roll and adapted to be wound on the spool, a lever having a link on which the roll has rotary mounting and which swings during said displacement, and means for moving the lever to draw the roll away from the winding mechanism when displaced by the yarn sufficiently to bring the trunnion in registration with the track.

63. In a setting machine, a rotary spindle which is a part of a winding mechanism to which a spool is deliverable for engagement by the spindle, means to lay an end of yarn across the spool, a presser roll originally spaced from the spindle but movable into contact with the spool, a pusher to tuck the end of the yarn into the crotch between the spool and presser roll, and means initially connecting the spindle and presser roll to compel said roll to positively turn with the spool.

64. In a setting machine, winding mechanism to impart rotation to a spool delivered thereto, a freely mounted presser roll movable into contact with the spool and with yarn adapted to be wound on the spool, and gearing between the winding mechanism and presser roll, temporarily meshed upon said movement of the roll to initially compel said roll to turn with the spool.

65. In a setting machine, winding mechanism for imparting rotation to a spool delivered thereto, a presser roll movable into contact with the spool, a pusher for tucking an end of yarn in the crotch between the spool and roll, and a yielding mounting for the presser roll permitting a slight separation of the presser roll from the spool under the action of the pusher.

66. In a setting machine, a movable pusher, and means for moving the pusher a plurality of times toward a spool and presser roll to insure tucking an end of yarn therebetween.

67. In a setting machine, a pusher, a rocker shaft having a pinion and carrying said pusher, a rack bar engaging the pinion, and means for reciprocating the rack bar to swing the pusher a plurality of times toward a spool and presser roll with which it cooperates to tuck yarn therebetween.

68. In a setting machine, winding mechanism for imparting rotation to a spool delivered thereto, a yarn carrier, a gripper and a gripper carrier therefor, and means for swinging the gripper carrier up to avoid the winding mechanism then toward the carrier for the gripping of yarn by the gripper, finally swinging the carrier back to lay the yarn across the spool.

69. In a setting machine, a gripper, a gripper carrier by which the gripper is carried, suspending means for the gripper carrier, means to uniformly move the suspending means and gripper from a gripping position in one direction to pull a yarn, and means to raise the suspending means and gripper means prior to lowering them on the return movement to the gripping position.

70. In a setting machine, a gripper comprising fixed and movable jaws, a gripper carrier by which the gripper is moved to a yarn gripping position, a rocker shaft mounted on the carrier, means loosely connecting the rock shaft with the movable jaw to actuate the latter, a weighted arm projecting from the rock shaft to rock the shaft in one direction and open the movable jaw, and means shifting the arm upon arrival of the gripper carrier at said position to rock the shaft in the other direction and close the movable jaw upon an end of yarn received between the jaws at said position.

71. In a setting machine, fixed and movable jaws comprising a gripper, a rocker shaft, means loosely connecting the rock shaft with the movable jaw to actuate the latter, a carrier by which the shaft and fixed jaw are supported being movable in two directions to advance and retract the gripper in respect to a yarn gripping position, a weighted arm connected with and rocking the shaft in one direction during the advance of the gripper to hold the movable jaw open, means to lift the arm at said position to counter-rock the shaft and close the movable jaw upon an end of yarn at said position, and a pawl and ratchet for holding the shaft in said rocked position against the opening tendency of said arm during retraction of the gripper.

72. In a setting machine, an elevator having a groove with a stop, means to insert a clamp in the groove, means to move the elevator to engage the clamp with a strand of yarn, and means to press against one end of the clamp to force the clamp against the stop to close the clamp upon said strand.

73. In a setting machine, an elevator having a groove closed at one end, means to insert a clamp in the groove comprising a pair of combs having their ends out of alinement and teeth normally in alinement, means to move the elevator into a position to receive a strand of yarn between the teeth, and means to push the clamp against the stop thus to move the teeth out of alinement and clamp the yarn.

74. In a setting machine, winding mechanism to impart rotation to a spool and wind a plurality of strands thereon, a clamp to hold the free ends of the strands separated, an elevator to which the clamp is delivered and in which it is closed to clamp said yarn ends, and means to move the elevator into a position to facilitate abstraction of the clamp from the elevator prior to winding the free ends upon the spool.

75. In a setting machine, an elevator having a groove to loosely receive a yarn clamp, winding mechanism to impart rotation to a spool and thus wind a plurality of strands of yarn crossing the elevator at a point above the clamp, and means to primarily move the elevator to present the clamp to the free ends of yarn thus to clamp them in a separated position and secondarily to advance the elevator to a position facilitating the abstraction of the clamp from the groove prior to winding said ends upon the spool.

76. In a setting machine, a clamp, an elevator by which the clamp is loosely held in an initial position below a strand of yarn to be clamped, tracks having curved portions between which the elevator is guided, and means to move the elevator along said tracks in two stages, first to engage the clamp with the end of a strand of yarn, second to tilt the elevator by advancement along said curved portions to facilitate the abstraction of said clamp.

77. In a setting machine, a clamp magazine having a grooved guide rail adapted to receive a clamp, a movable elevator having a groove periodically registrable with the groove in the guide rail, and means for pushing the clamp along the registering grooves from the guide rail to the elevator while the elevator is at one extremity of its movement.

78. In a setting machine, a clamp magazine to hold a plurality of clamps, a grooved guide rail comprising part of the magazine, a stop positioned over the groove at the outlet of the magazine, and means to bodily move the clamps toward the stop allowing one of the clamps to fall into the groove.

79. In a setting machine, a guide rail having a groove to receive a yarn clamp, means movable along the guide rail having a finger occupying the groove to engage one end of the clamp, and a rockable lever to move said means causing the finger to push the clamp along said groove.

80. In a setting machine, an elevator for presenting a clamp to a strand of yarn extending thereacross, means associated with the elevator to actuate the clamp for clamping the yarn, normally suspended cutting mechanism movable into proximity with the elevator upon clamping the yarn, and means for then actuating the cutting mechanism to sever the yarn at one side of the clamp.

81. In a setting machine, a yarn carrier from which extends a strand of yarn to be wound, a movable elevator for presenting a clamp to the yarn, means associated with the elevator for clamping the yarn at a point adjacent to the yarn carrier, and cutting mechanism movable into position between said carrier and elevator to sever the yarn at one side of the clamp.

82. In a setting machine, an elevator movable to present a clamp to a plurality of strands of yarn and hold them separated, means movable into engagement with said strands at a place spaced from the clamp to again hold the strands separated, and a cutter blade to traverse said means to sever the strands.

83. In a setting machine, cutting mechanism comprising a bar movable toward a plurality of taut strands of yarn, a pair of spaced combs carried by the bar between the teeth of which said strands are received, and a knife movably guided by the bar traversing the combs in the spaces therebetween to sever the yarn.

84. In a setting machine, a suspended bar movable toward a plurality of taut strands of yarn, a pair of spaced combs carried by the bar between the teeth of which the yarn is received, slidable means guided by the bar, a knife supported by the slidable means in position between the combs, and means to move the slidable means along the bar causing the knife to sever the yarn along the combs.

85. In a setting machine, a bar having a comb to engage a plurality of taut strands of yarn, a knife movably mounted on the bar to sever the yarn, an articulated suspension member for the bar, and means for actuating the suspension to alternately move the comb into and out of engagement with the yarn for alternate cutting operations of the knife member.

86. In a setting machine, means to rotate a spool preparatory to winding a strand thereon, strand-applying means by which a strand is brought into winding position in respect to the spool, and means coordinating the actions of both means to occur successively and periodically.

87. In a setting machine, means to impart initial rotation to a spool preparatory to winding a strand thereon, means to convey the end of a strand into a winding position in respect to the spool, means to apply the end against the spool so that the spool can take hold, and means coordinating the actions of the foregoing means for a successive operation thereof.

88. In a setting machine, spool rotating means, means for directing yarn to the spool, means actuated by the machine for successively feeding spools to a winding position and ejecting said spools from the machine when wound, and timing means for coordinating the actions of the foregoing means.

89. In a setting machine, spool rotating means, means for directing yarn to the spool, means to apply the yarn so that the spool will take hold, presser rolls shiftable toward the spool to bear on the yarn as wound, and timing means for coordinating the actions of each of the foregoing means and said shifting of the presser rolls.

90. In a setting machine, means for rotating a spool to wind multiple yarn strands thereon, means to hold a portable clamp in readiness for application to the strands, and means for transferring the clamp from its holding means and applying it to said strands to hold them separated.

91. In a setting machine, intermittently rotatable means for rotating successive spools to wind multiple yarn strands on each, a magazine of portable clamps, and means acting alternately with said rotatable means to successively remove clamps from the magazine and apply them to the strands to hold them separated.

92. In a setting machine, intermittently rotatable means for rotating successive spools to wind multiple yarn strands on each, a magazine of portable clamps, means acting alternately with said rotatable means to successively remove clamps from the magazine and apply them to the strands to hold them separated, and means operable after each clamp application to sever the unwound yarn at the clamp.

93. In a setting machine, a magazine of portable clamps, means for periodically projecting a clamp from the magazine toward a yarn-clamping position, and means to replace each clamp by another from the magazine after each projection.

94. In a setting machine, a magazine of portable clamps, guide means extending from the magazine, and means for displacing a clamp from the magazine to the guide means for movement along the guide means.

95. In a setting machine, a magazine of portable clamps, guide means extending from the magazine, means for displacing a clamp from the magazine to the guide means for movement along the guide means, and means operable along the guide means to move the clamp toward a yarn-clamping position.

96. In a setting machine, a magazine of portable clamps, means to periodically receive and move successive clamps to a yarn-clamping position, and means working intermittently between the magazine and the receiving position of said first means to keep the latter supplied with clamps.

97. In a setting machine, a magazine of portable clamps, means for moving a clamp from the magazine in a rectilinear direction toward a yarn-clamping position, and means waiting to receive the clamp and move it in another direction to the ultimate yarn-clamping position.

98. In a setting machine, a clamp elevator, means to supply the elevator with a clamp, and means to successively lift the elevator to first dispose the clamp in a yarn-clamping position then in a position of discharge from the elevator.

99. In a setting machine, a clamp elevator, means to supply the elevator with a clamp, a cam having a two-stage face, and means joining the elevator with the cam, being actuated by said face to successively lift the elevator to yarn-clamping and discharge positions of the clamp.

100. In a setting machine, a magazine for containing a quantity of empty spools, discharge means by which the spools are conducted from the machine as wound, means by which empty spools are delivered in regular succession from the magazine to a winding position, and means for regularly starting a supply of yarn on each spool between the delivering and discharging events.

101. In a setting machine, a plurality of yarn carriers, jacquard mechanism for moving a selected group of carriers to a gripping position, spool rotating means, and gripping means movable in two directions in respect to said rotating means, first to the gripping position to grip the yarn ends, second to an original position to lay the yarn ends across the spool.

102. In a setting machine, a reciprocable yarn carrier, a swingable gripper, a common cam shaft having a pair of cams, and operating connections between the cams and the carrier and gripper respectively to move the yarn carrier toward and from a gripping position and swing the gripper to said position between said movements.

103. In a setting machine, a yarn carrier, gripping means, means to move the gripping means with an interrupted motion toward the carrier to grip the yarn and with a regular return motion to an original position, and spooling mechanism situated at the point where the interruption occurs, being avoided in the first instance and having the yarn laid across the spool in the second instance.

104. In a setting machine, spool rotating means, means for supplying the rotating means with spools and ejecting wound spools from the machine, means for intermediately applying yarn to the spools to be wound thereon, and means for coordinating the actions of each of said means to occur in the order stated.

105. In a setting machine, spool rotating means, means for supplying the rotating means with spools and ejecting wound spools from the machine, means for intermediately applying yarn to the spools to be wound thereon, presser rolls and means for engaging them with the yarn during winding, and means for coordinating the actions of each of said means to occur in the order stated.

106. In a setting machine, spool rotating means, means for directing yarn strands to the spool, a clamp magazine, means for taking a clamp from the magazine and means for applying it to the yarn, a cam shaft, and cams thereon for causing the successive operation of the foregoing means.

107. In a setting machine, a clamp having relatively movable components, means for positioning the clamp on the yarn at the approximate end of a winding operation, and means to move the components to clamp the yarn at the end of said operation.

108. In a setting machine, a clamp having relatively movable components, means for positioning the clamp on the yarn at the approximate end of a winding operation, means to move the components to clamp the yarn at the end of said operation, means to then cut the yarn, and means to coordinate the actions of the foregoing means for successive occurrence.

109. In a setting machine, a spool magazine, means to retain spools in the magazine, a spool guide, and means to move said guide toward the magazine to simultaneously force a spool past the retaining means and receive the spool.

110. In a setting machine, a spool magazine, a spool guide movable to a dislodging position adjacent to the magazine, and means on the spool guide to act against a spool to dislodge it from the magazine for reception by said guide while in the dislodging position.

111. In a setting machine, a spool magazine, a spool guide having the characteristics of a pocket being movable to a dislodging position adjacent to the magazine, and means on the guide to press a spool out of the magazine when the guide assumes the dislodging position so that the spool will fall into the pocket.

112. In a setting machine, a spool guide movable toward and from a yarn-winding position comprising a relatively rigid member and a complementary member arranged to yield upon retention of a spool at and return of the guide from said position.

113. In a setting machine, means for gripping a spool at a winding position, and a spool guide movable for the delivery of a spool at said position, said guide including a retainer strip which is yieldable to release the spool upon gripping of the spool and a departure of the spool guide from said position.

114. In a setting machine, a spool guide movable toward and from a yarn-winding position comprising a relatively rigid member, a complementary member having a yieldable quality, and means movably mounting the complementary member to the rigid member.

115. In a setting machine, a spool magazine, means for gripping a spool at a winding position, and means movable toward the magazine and winding position simultaneously, causing the successive release of a spool from the magazine and the delivery thereof to the gripping means at the winding position.

116. In a setting machine, means for delivering a spool to a winding position, means at said position for gripping and rotating the spool, and means coordinating the actions of the delivering, gripping and rotating means so as to occur successively.

117. In a setting machine, means for periodically delivering spools from a common source to a winding position, means at said position for gripping and rotating each spool, and means coordinating the actions of the respective means so as to occur alternately.

118. In a setting machine, means to deliver a spool to a winding position, presser rolls operable at approximately opposite sides of the spool for engaging a filling of yarn as wound on the spool, a cushioned support for a roll at one side, and a yielding support for a roll at the other side.

119. In a setting machine, means to deliver a spool to a winding position, presser rolls operable at approximately opposite sides of the spool for engaging a filling of yarn as wound on the spool, resilient pressure-means providing a cushioned support for a roll at one side, and a yielding support for a roll at the other side, respecting which support said roll can move by gravity.

120. In a setting machine, spool rotating means, guide means approaching said rotating means from different directions, roll-carrying means each having a roll, being movable along the respective guide means, means for starting the rotating means upon introduction of a spool, and means for then moving the roll-carrying means toward the rotating means to bring the rolls in a pressing position.

Signed at Thompsonville, in the county of Hartford and State of Connecticut, this 21st day of December, A. D. 1927.

WILLIAM PEARSALL.